United States Patent
Russell et al.

(10) Patent No.: US 8,930,561 B2
(45) Date of Patent: Jan. 6, 2015

(54) ADDITION OF SUPPLEMENTAL MULTIMEDIA CONTENT AND INTERACTIVE CAPABILITY AT THE CLIENT

(75) Inventors: Riley R. Russell, San Mateo, CA (US); Gary Zalewski, Oakland, CA (US)

(73) Assignee: Sony Computer Entertainment America LLC, San Mateo, CA (US)

(*) Notice: Subject to any disclaimer, the term of this patent is extended or adjusted under 35 U.S.C. 154(b) by 709 days.

(21) Appl. No.: 12/537,606

(22) Filed: Aug. 7, 2009

(65) Prior Publication Data

US 2010/0306402 A1 Dec. 2, 2010

Related U.S. Application Data

(60) Provisional application No. 61/183,539, filed on Jun. 2, 2009.

(51) Int. Cl.
*G06F 15/16* (2006.01)
(Continued)

(52) U.S. Cl.
CPC .............. *A63F 13/12* (2013.01); *H04N 21/235* (2013.01); *H04N 21/4307* (2013.01); *H04N 21/435* (2013.01); *H04N 21/47205* (2013.01); *H04N 21/4758* (2013.01); *H04N 21/4781* (2013.01); *H04N 21/812* (2013.01); *H04N 21/8545* (2013.01); *A63F 2300/409* (2013.01); *A63F 2300/513* (2013.01); *A63F 2300/5506* (2013.01); *A63F 2300/5573* (2013.01); *A63F 2300/572* (2013.01); *A63F 2300/575* (2013.01); *A63F 2300/69* (2013.01)
USPC ............................ 709/231; 709/219; 709/217

(58) Field of Classification Search
CPC .. A63F 13/12; H04N 21/235; H04N 21/4307; H04N 21/435; H04N 21/47205; H04N 21/4758
USPC ........................................................ 709/231
See application file for complete search history.

(56) References Cited

U.S. PATENT DOCUMENTS 7,593,867 B2 9/2009 Deakin et al. ................ 705/26.1
7,861,150 B2 12/2010 Colle et al. .................... 715/203
(Continued)

FOREIGN PATENT DOCUMENTS

WO   WO0019332    *  4/2000
WO   WO03/102728     12/2003

OTHER PUBLICATIONS

International Preliminary Report on Patentability and Written Opinion for PCT/US2010/033291, mailed on Dec. 15, 2011.

(Continued)

*Primary Examiner* — Jude Jean Gilles
*Assistant Examiner* — Jaren M Means
(74) *Attorney, Agent, or Firm* — Martine Penilla Group, LLP

(57) ABSTRACT

Methods, systems, and computer programs for delivering supplemental content within streamed media are provided. In one embodiment, a method includes receiving a request at a client for a media segment, which includes a plurality of video frames. Further, a stream of the media segment to the client from a media server is obtained and supplemental content (SC) is accessed from storage in the client or from an SC server. The access of the SC from the SC server can be performed before receiving the request, or while obtaining the stream, or after the stream has been obtained. Further, the method includes combining the media segment with the SC at the client, which inserts the SC to add or augment video frames from the media segment. The combination is then displayed to the user.

26 Claims, 25 Drawing Sheets

(51) Int. Cl.
*A63F 13/30* (2014.01)
*H04N 21/235* (2011.01)
*H04N 21/43* (2011.01)
*H04N 21/435* (2011.01)
*H04N 21/472* (2011.01)
*H04N 21/475* (2011.01)
*H04N 21/478* (2011.01)
*H04N 21/81* (2011.01)
*H04N 21/8545* (2011.01)

(56) References Cited

U.S. PATENT DOCUMENTS

| | | | |
|---|---|---|---|
| 7,913,157 B1* | 3/2011 | Stoakley et al. | 715/203 |
| 2002/0062481 A1 | 5/2002 | Slaney et al. | 725/42 |
| 2002/0078441 A1* | 6/2002 | Drake et al. | 725/9 |
| 2002/0199189 A1* | 12/2002 | Prijatel et al. | 725/36 |
| 2003/0229900 A1 | 12/2003 | Reisman | 725/87 |
| 2004/0031058 A1 | 2/2004 | Reisman | 725/112 |
| 2004/0148221 A1 | 7/2004 | Chu | 705/14 |
| 2006/0159109 A1* | 7/2006 | Lamkin et al. | 370/401 |
| 2007/0043616 A1* | 2/2007 | Kutaragi et al. | 705/14 |
| 2008/0092158 A1 | 4/2008 | Bhatnagar et al. | 725/34 |
| 2008/0201736 A1 | 8/2008 | Gordon et al. | 725/34 |
| 2008/0215428 A1* | 9/2008 | Ramer et al. | 705/14 |
| 2008/0320512 A1 | 12/2008 | Knight | 725/32 |
| 2009/0028434 A1* | 1/2009 | Vanhoucke et al. | 382/182 |
| 2009/0089838 A1 | 4/2009 | Pino et al. | 725/40 |
| 2009/0092374 A1 | 4/2009 | Kulas | 386/95 |
| 2009/0099928 A1 | 4/2009 | Vasile | 705/31 |
| 2009/0319672 A1 | 12/2009 | Reisman | 709/227 |
| 2009/0320073 A1 | 12/2009 | Reisman | 725/51 |
| 2011/0219419 A1 | 9/2011 | Reisman | 725/112 |

OTHER PUBLICATIONS

International Preliminary Report on Patentability and Written Opinion for PCT/US2010/032445, mailed on Dec. 15, 2011.

* cited by examiner

Ad Delivery Scheduling Criteria

| Ad ID | Impressions | Target | Trigger | Platform | Rating | Bandwidth |
|---|---|---|---|---|---|---|
| McD 11 | 123,456 | All | 8-10 PM | All | PG | Low |
| McD 12 | 27,000 | 15-25 males, CA | Sports | Remote control | R | Medium |
| McD 12 | 500 | Top 10% income zip code | American Idol | PS3, microphone | G | High |
| McD 14 | 9,001 | Europe | Old TV Programs | PC | G | Low |
| . . . | | | | | | |

Fig. 5

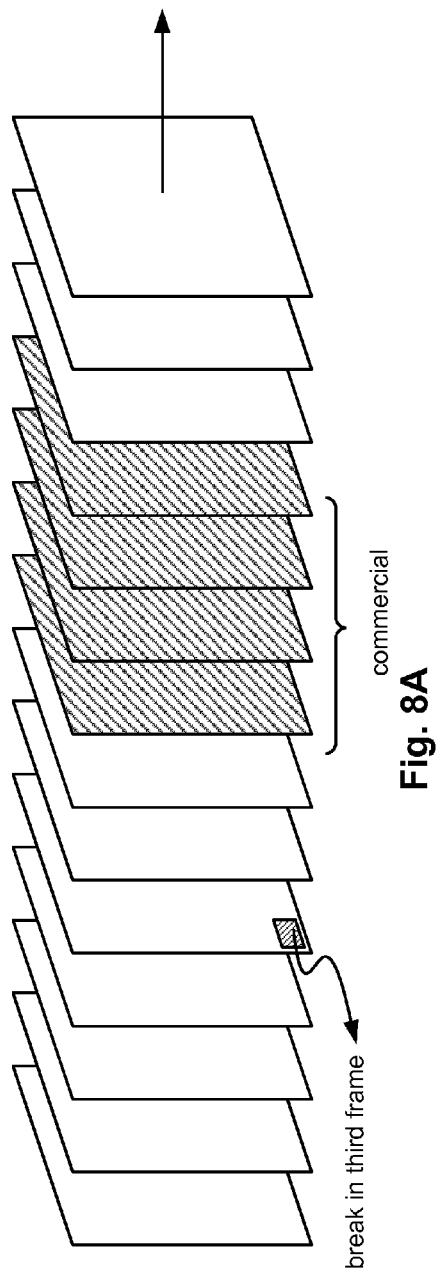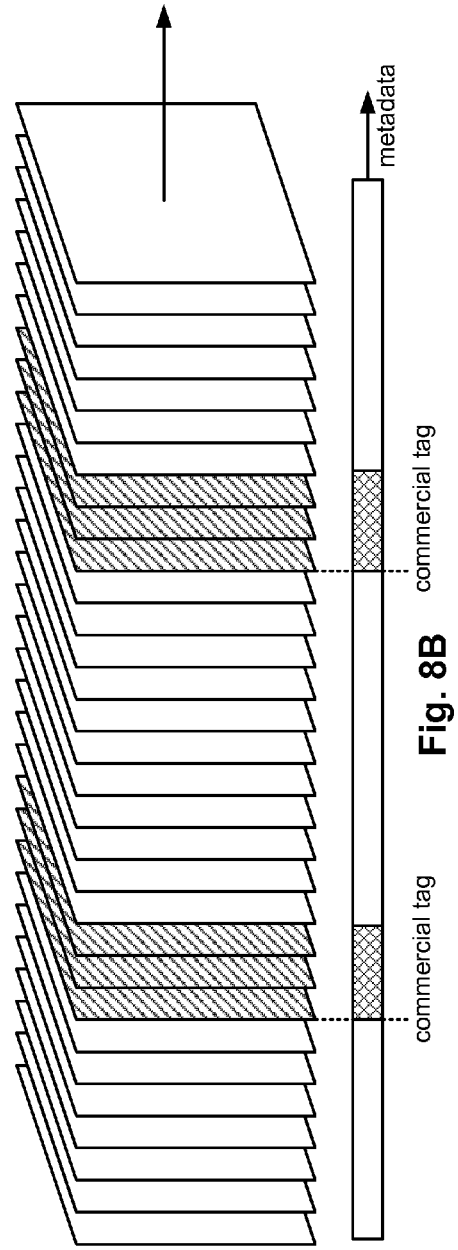

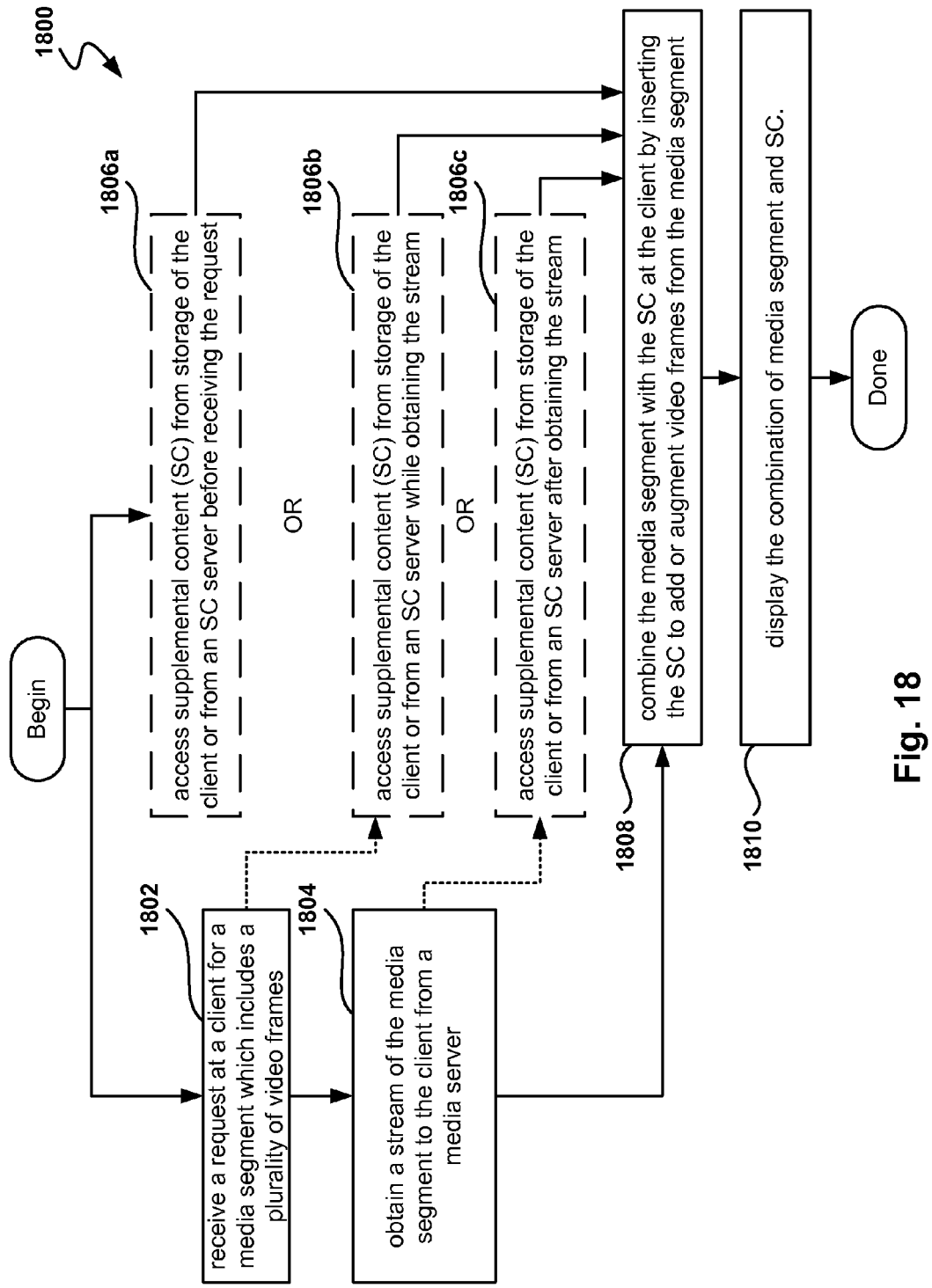

ADDITION OF SUPPLEMENTAL MULTIMEDIA CONTENT AND INTERACTIVE CAPABILITY AT THE CLIENT

CLAIM OF PRIORITY

This application claims priority from U.S. Provisional Patent Application No. 61/183,539, filed Jun. 2, 2009, and entitled "ADDITION OF SUPPLEMENTAL MULTIMEDIA CONTENT AND INTERACTIVE CAPABILITY AT THE CLIENT." This provisional application is herein incorporated by reference.

CROSS REFERENCE TO RELATED APPLICATIONS

This application is related to U.S. patent application Ser. No. 11/429,414, filed May 4, 2006 and entitled, "COMPUTER IMAGE AND AUDIO PROCESSING OF INTENSITY AND INPUT DEVICES FOR INTERFACING WITH A COMPUTER PROGRAM"; U.S. patent application Ser. No. 11/588,779, filed Oct. 26, 2006 and entitled, "SYSTEM AND METHOD FOR INTERFACING WITH A COMPUTER PROGRAM"; U.S. patent application Ser. No. 10/663,236, filed Sep. 15, 2003 and entitled, "METHOD AND APPARATUS FOR ADJUSTING A VIEW OF A SCENE BEING DISPLAYED ACCORDING TO TRACKED HEAD MOTION"; U.S. patent application Ser. No. 12/145,455, filed Jun. 24, 2008 and entitled, "DETERMINATION OF CONTROLLER THREE-DIMENSIONAL LOCATION USING IMAGE ANALYSIS AND ULTRASONIC COMMUNICATION"; U.S. patent application Ser. No. 12/259,181, filed Oct. 27, 2008, and entitled, "DETERMINING LOCATION AND MOVEMENT OF BALL-ATTACHED CONTROLLER"; U.S. patent application Ser. No. 12/426,186, filed on Apr. 17, 2009, and entitled "CONTROL DEVICE FOR COMMUNICATING VISUAL INFORMATION"; U.S. patent application Ser. No. 12/428,433, filed Apr. 22, 2009 and entitled, "EXPANDABLE CONTROL DEVICE VIA HARDWARE ATTACHMENT", all of which are incorporated herein by reference.

BACKGROUND

1. Field of the Invention

The present invention relates to methods, systems and computer programs for adding content to streamed media.

2. Description of the Related Art

The video game industry has seen many changes over the years. As computing power has expanded, developers of video games have likewise created game software that takes advantage of these increases in computing power. To this end, video game developers have been coding games that incorporate sophisticated operations and mathematics to produce a very realistic game experience.

Example gaming platforms, may be the Sony Playstation®, Sony Playstation2® (PS2), and Sony Playstation3® (PS3), each of which is sold in the form of a game console. As is well known, the game console is designed to connect to a monitor (usually a television) and enable user interaction through handheld controllers. The game console is designed with specialized processing hardware, including a CPU, a graphics synthesizer for processing intensive graphics operations, a vector unit for performing geometry transformations, and other glue hardware, firmware, and software. Online gaming is also possible, where a user can interactively play against or with other users over the Internet.

Today's game console is not used just to play games, but are used as a computing device that can access the Internet to search for content, browse for multimedia downloads, shop online music, videos or movies, participate in multi-player games, enter virtual words, etc. Thus, a community of users is accessing online media, and this community of users has powerful computing devices and versatile interfaces. However, users are actively engaged while playing a game but become passive watchers while viewing downloaded media. Additionally, these powerful computing devices and versatile interfaces are used by a well known community of users, enabling new opportunities to improve the viewing of streamed media.

It is in this context that embodiments of the invention arise.

SUMMARY

Embodiments of the present invention provide methods, systems, and computer programs for delivering supplemental content within streamed media. In one embodiment, a method includes receiving a request at a client for a media segment, which includes a plurality of video frames. Further, a stream of the media segment to the client from a media server is obtained and supplemental content (SC) is accessed from storage in the client or from an SC server. The access of the SC from the SC server can be performed before receiving the request, or while obtaining the stream, or after the stream has been obtained. Further, the method includes combining the media segment with the SC at the client, which inserts the SC to add or augment video frames from the media segment. The combination is then displayed to the user.

It should be appreciated that the present invention can be implemented in numerous ways, such as a process, an apparatus, a system, a device or a method on a computer readable medium. Several inventive embodiments of the present invention are described below.

In another embodiment, a system for delivering supplemental content within streamed media includes a supplemental content (SC) server and a plurality of clients on a network. Each client from the plurality of clients downloads a media segment for a received request from a user interfacing through the corresponding client. The media segments for the plurality of clients are downloaded from a plurality of independent media servers, and each media segment includes a plurality of video frames. The clients notify the SC server after receiving the requests from the users. The SC server selects and transfers SC and SC instructions to each of the clients, which combine the media segment with the SC by inserting the SC to add or augment video frames within the media segment for displaying the media segment with the SC.

In yet another embodiment, a computer program embedded in a computer-readable storage medium, when executed by one or more processors, for delivering supplemental content within streamed media, includes program instructions for receiving a request at a client for a media segment which includes a plurality of video frames. Further, the computer program includes program instructions for obtaining a stream of the media segment to the client from a media server, and program instructions for accessing supplemental content (SC) from storage of the client or from an SC server. The access to the SC can be performed before receiving the request, or while obtaining the stream, or after obtaining the stream. Further yet, the computer program includes program instructions for combining the media segment with the SC at the client by inserting the SC to add or augment video frames from the media segment. Additionally, the computer program has program instructions for displaying the combination of media segment and SC.

In yet another embodiment, a system for delivering supplemental content within streamed media includes means for receiving a request at a client for a media segment, where the media segment includes a plurality of video frames. The system also includes means for obtaining a stream of the media segment to the client from a media server, and means for accessing supplemental content (SC) from storage of the client or from an SC server. The SC can be accessed before receiving the request, or while obtaining the stream, or after obtaining the stream. In addition, the system includes means for combining the media segment with the SC at the client by inserting the SC to add or augment video frames from the media segment. Additionally, the system includes means for displaying the combination of the media segment and the SC.

Other aspects of the invention will become apparent from the following detailed description, taken in conjunction with the accompanying drawings, illustrating by way of example the principles of the invention.

BRIEF DESCRIPTION OF THE DRAWINGS

The invention may best be understood by reference to the following description taken in conjunction with the accompanying drawings in which:

FIG. 5 illustrates the Ad Delivery Scheduling Criteria according to one embodiment.

FIGS. 8A-B picture embodiments for the placement of supplemental content within a video stream.

FIG. 18 shows the process flow for delivering supplemental content within streamed media in accordance with one embodiment of the invention.

DETAILED DESCRIPTION

The following embodiments describe a method and apparatus for delivering supplemental content within streamed media. It will be obvious, however, to one skilled in the art, that the present invention may be practiced without some or all of these specific details. In other instances, well known process operations have not been described in detail in order not to unnecessarily obscure the present invention.

Figure 1A:
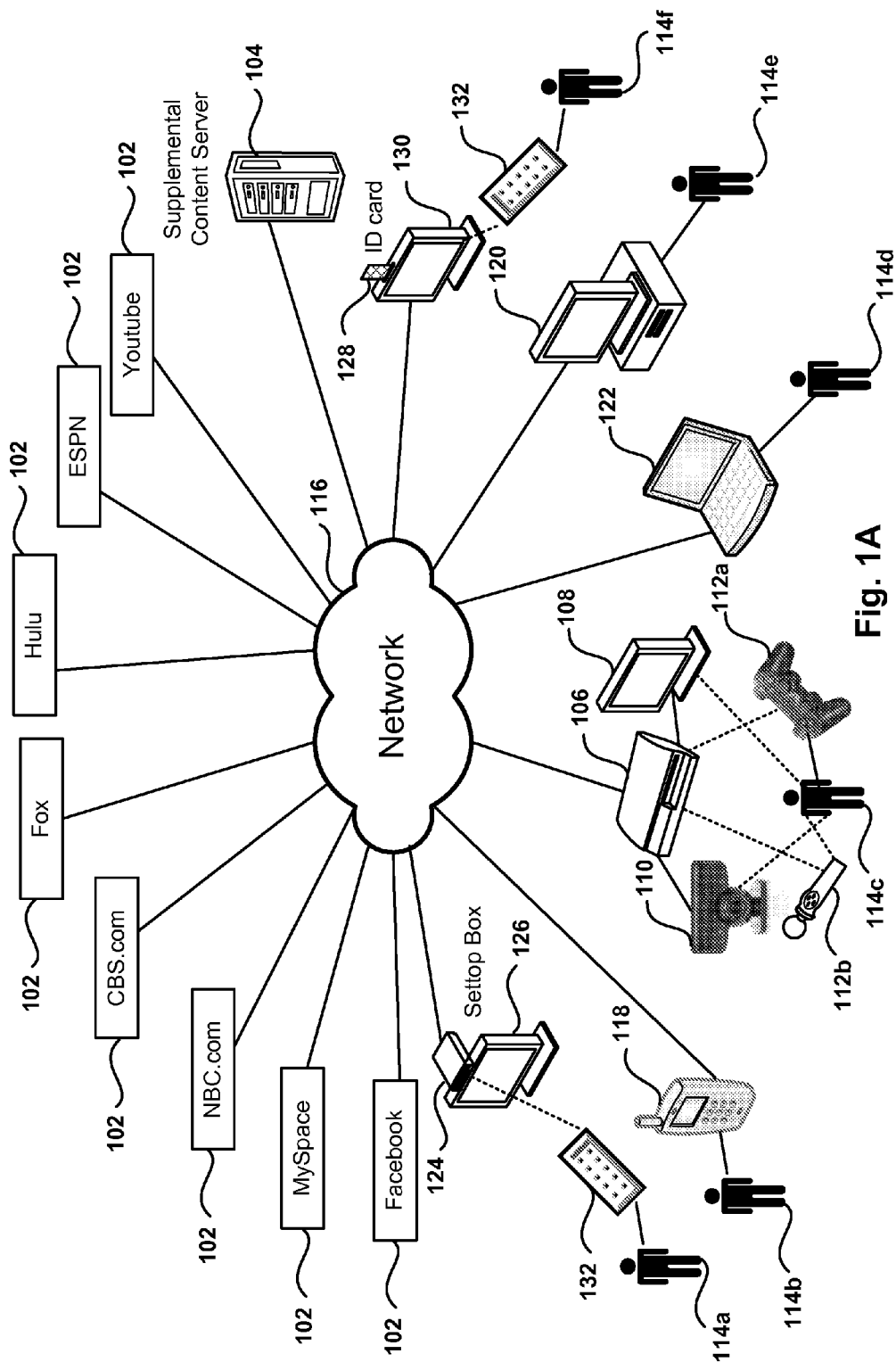
FIGS. 1A-B show schematic diagrams of a networked environment for delivery of multimedia content, according to one embodiment.
Figure 1B:
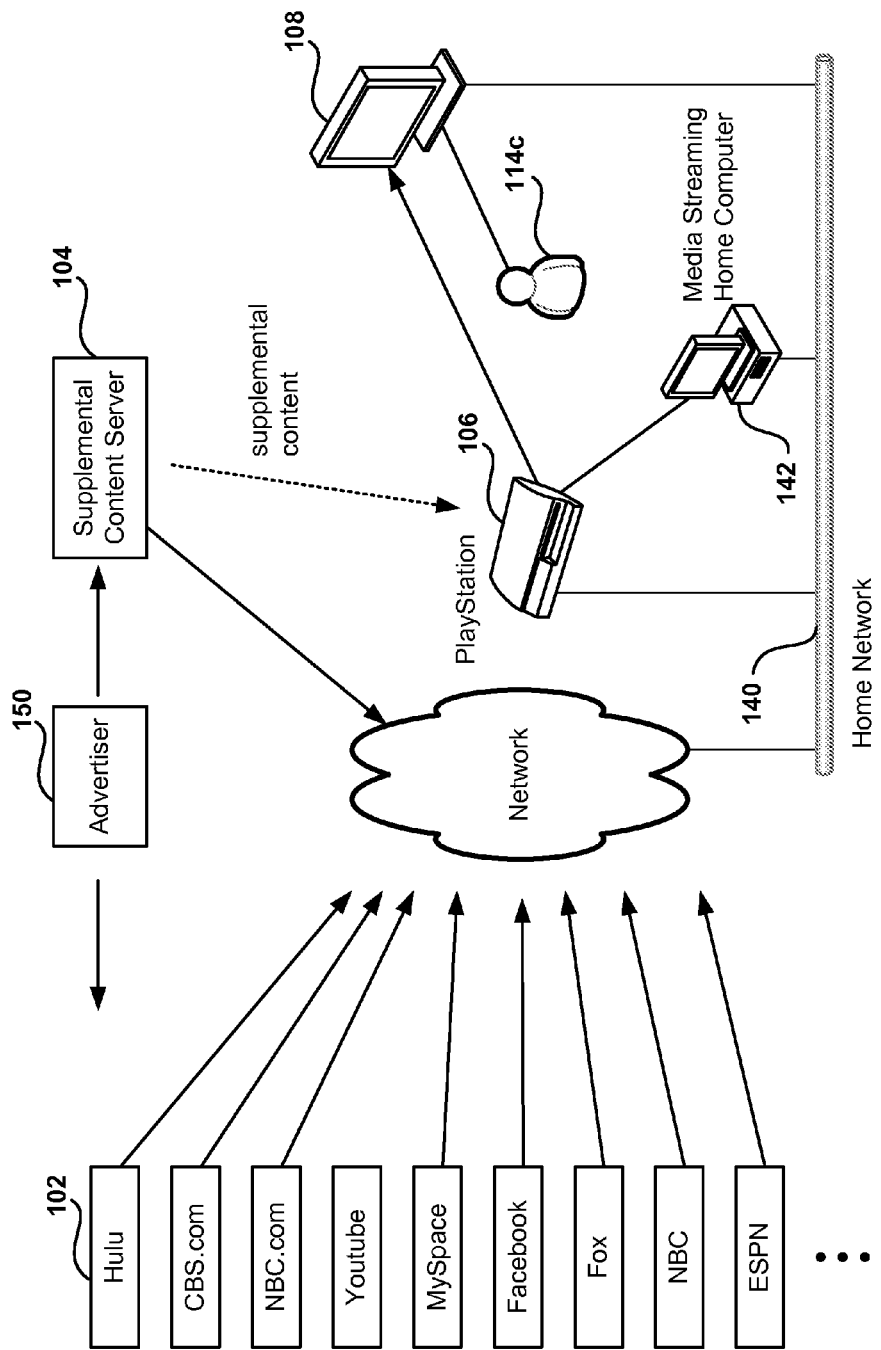

FIGS. 1A-B show schematic diagrams of a networked environment for delivery of multimedia content, according to one embodiment. FIG. 1A includes a plurality of content providers 102 which are available to a plurality of users 114a-f for providing media that can be downloaded to different client devices. Media 102, distributed through network 116, can be of several types, such as internet streamed media, broadcast media, on-demand media supplied by a cable company, photos posted on a social network, etc. A unique piece of downloaded media indented to be shown in its entirety to a user as a single unit is referred to herein as a media segment.

Different client devices are available for receiving the media content and displaying the media to users 114a-f. The client devices include set-top box 124 connected to a TV display, mobile phone 118, game console 106, laptop 122, Personal Computer 120, TV 130 configured with an ID card 128, etc. Additionally, users 114a-f interact with the different client devices in many ways, such as with remote control 132, voice commands, mobile phone keys, camera 110 to capture user images in order to perform motion detection, game controllers 112a-b, keyboard, etc.

Supplemental Content Server 104 is in communication with the client devices to provide supplemental content to the client devices. Supplemental content (SC) refers to any content shown to the user while accessing downloaded media content which was not part of the original downloaded media content. For example, SC can be a video commercial, a game, a computer program, a song, a photo, a document, a presentation, a billboard, a coupon, a video conference, etc. Additionally, the SC can be inserted between consecutive frames of the media stream, that is, the media stream viewing is temporarily halted while the user access the SC, or the SC can be displayed together with the media stream, such as a banner inside the viewing area, or additional information presented outside the display area of the video stream.

In one embodiment, the content provider 102 coordinates activities with supplemental content server 104 for the placement of the supplemental content, such as providing metadata for the placement of commercials.

FIG. 1B includes a pictorial representation of the information flow for the system presented in FIG. 1A. Media providers 102 transfer content to PlayStation 106 which is then shown to user 114c on display 108. Home network 140 interconnects the difference devices within the home and includes a connection to the internet for communication with outside media providers 102. In one embodiment, devices in the home network support DLNA (Digital Living Network Alliance), which is a standard used by manufacturers of consumer electronics to allow entertainment devices within the home to share their content with each other across a home network without a complicated configuration process. Thus, home computer 142 supporting DLNA downloads content from media providers 102 and makes the content available to PlayStation 106 via DLNA. Using DLNA's terms, home computer 142 acts as a Digital Media Server for PlayStation 106 which is the Digital Media Player. In another embodiment, Media providers 102 transfer content directly to PlayStation 106 via the network. Thus, user 114c with PlayStation 106 can view downloaded content to PlayStation 106 without the need of a media streaming computer or other download device, such as a cable or satellite box.

A similar DLNA implementation currently available in the market is offered as a software package named PlayOn™, which runs on a PC and converts the PC into a Digital Media Server. A partial description for the implementation of PlayOn can be found in U.S. patent application Ser. No. 10/753,612, which is incorporated herein by reference.

Advertiser 150 coordinates activities with media providers 102 and Supplemental Content Server (SCS) 104 for adding content to the media provided by the media providers 102, to the SC provided by SCS 104, or to both. The client device, such as PlayStation 106, receives the media content and the SC, combines both, and then presents the combination to user 114c on display 108.

It should be appreciated that the embodiment illustrated in FIG. 1B is exemplary addition of supplemental commercial content as directed by advertisers. Other embodiments may utilize different types of supplemental content which can be provided by other types of entities, such as news organizations, search engines, etc. The embodiments illustrated in FIG. 1B should therefore not be interpreted to be exclusive or limiting, but rather exemplary or illustrative.

Figure 2:
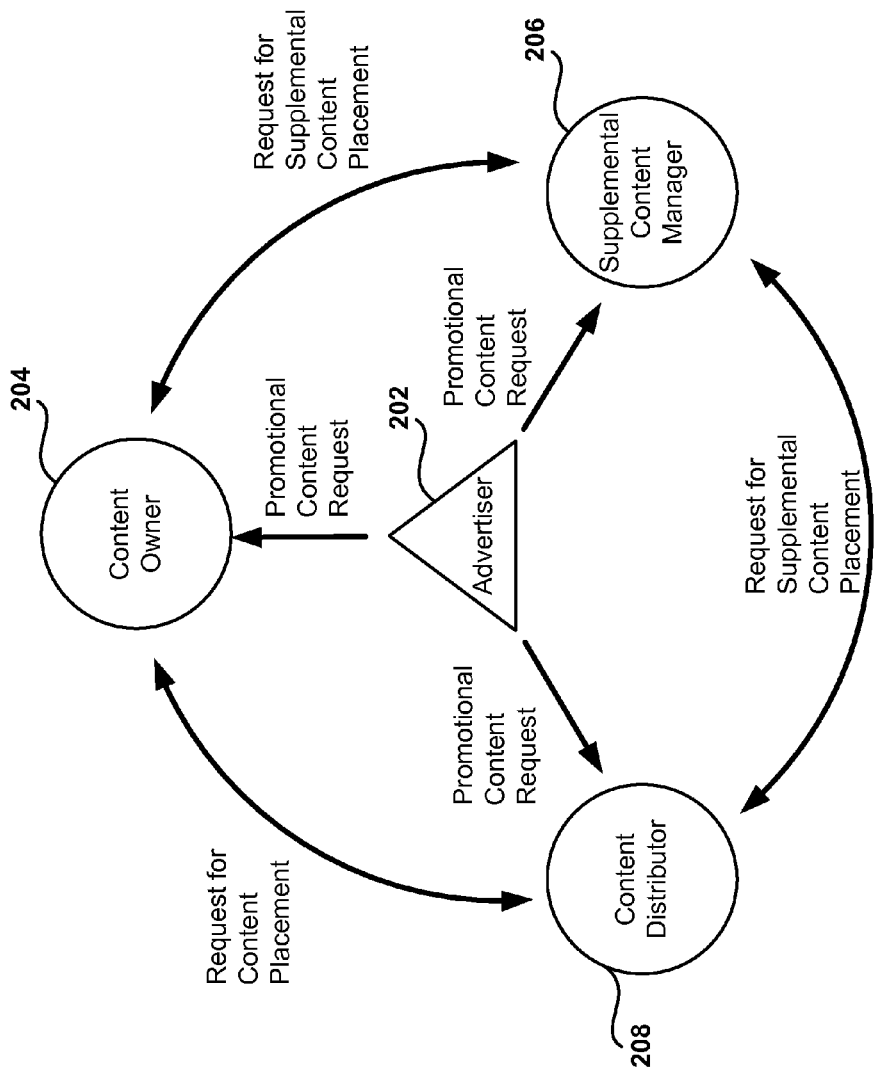
FIG. 2 illustrates some of the parties involved in the delivery of supplemental content and the relationships between the parties.

FIG. 2 illustrates some of the parties involved in the delivery of supplemental content and the relationships between the parties. Advertiser 202 places promotional content requests with content owners 204, content distributors 208, and supplemental content managers (SCM) 206 in order to distribute the advertiser's marketing message to users in the system. In one embodiment, content owner 204, content distributor 208, and SCM 206 cooperate in order to determine how to deliver content to users. For example, an advertiser may contact SCM 206 to place a certain commercial to users downloading media from the internet. SCM 206 coordinates activities with content distributor 208, such that when content distributor 208 downloads media to a client, the SCM receives metadata information in order to insert the advertiser's message in the downloaded media.

FIG. 2 illustrates the relationships between the different entities or servers, but other embodiments are possible where only some of these relationships are actually implemented. For example, SCM 206 may insert supplemental content without content distributor 208 being aware that content is being added, therefore there is no requirement that SCM 206 must have a formal relationship with content distributor 208. Often, the relationships between the different entities may include revenue sharing agreements. For example, the cooperation between content distributor 208 and SCM 206 causes the entity managing SCM 206 to give some of the revenue received from advertiser 202 to content distributor 208.

Figure 3:
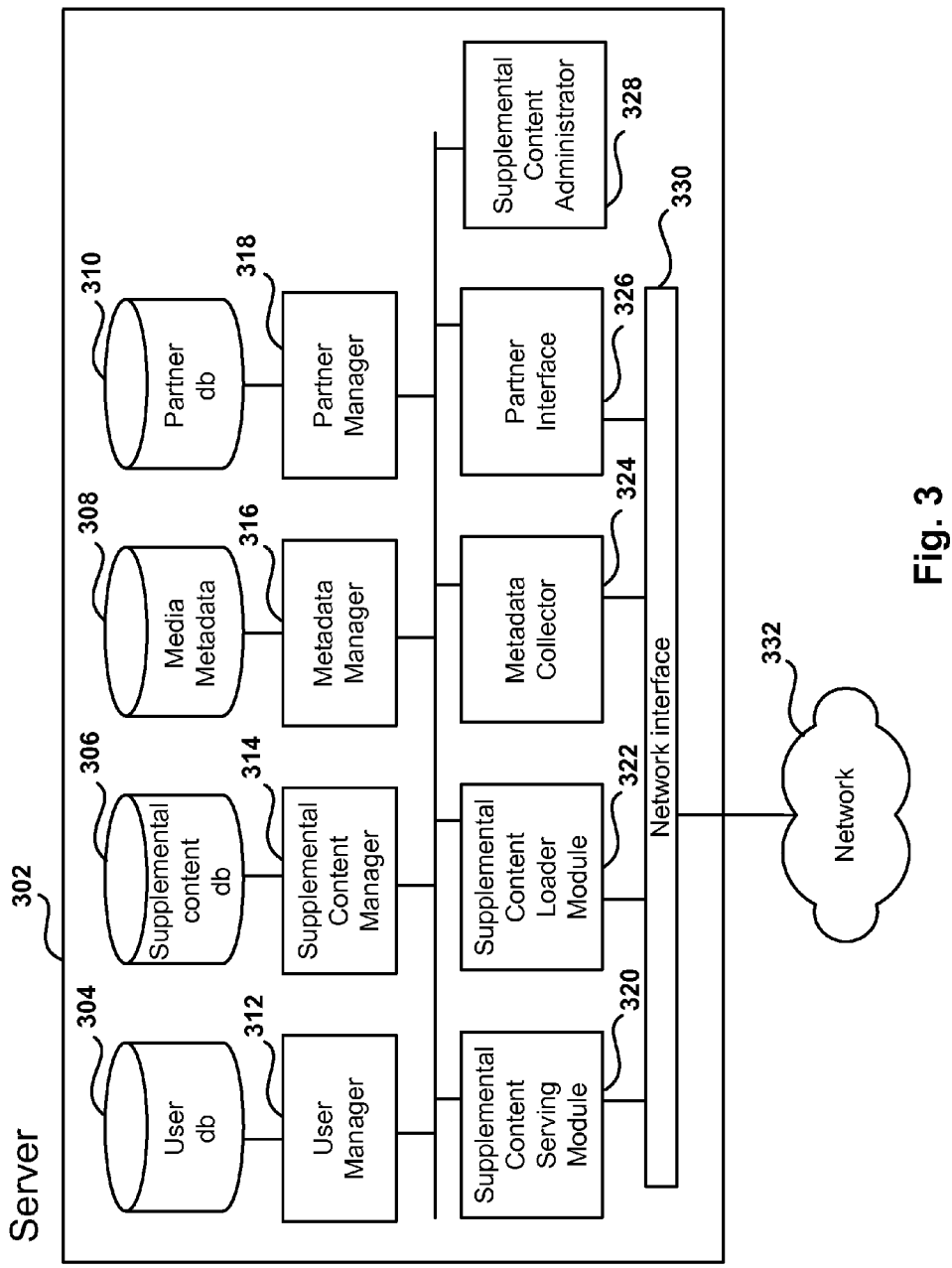
FIG. 3 depicts the Supplemental Content Server architecture, according to one embodiment.

FIG. 3 depicts Supplemental Content Server 302 architecture, according to one embodiment. SCS 302 includes different databases, such as user database 304, SC database 306, media metadata database 308, and partner database 310. User database 304 includes information about users associated with SCS 302. Some of the users have registered with SCS 302 and have a login and password that uniquely define the user within SCS 302. Other users have not registered with SCS 302, yet SCS may still contain information related to these users that has been collected over time. In one embodiment, SCS 302 indexes users in the database by a unique identifier associated with the client device, such as a serial number (S/N) of a game console. SCS 302 monitors some of the activities or communications for each user to collect information regarding the user, such as the Internet Protocol address (IP), type of content downloaded, schedule, longevity in the system, etc. User database 304 is managed by user manager module 312 that receives information requests and provides information responses related to the users in user database 304.

SC database 306 holds information regarding Supplemental Content and is managed by SC Manager 314. Media metadata database 308 holds information regarding media available for download to users in the system. For example, a sample media metadata for a TV episode can include title, description, actors, date first-time aired, location of commercials, locations of possible spots for SC placement, media content providers for the episode, etc.

Partner database 310 holds information about partners for SCS 302. This information includes partner id, partner category (such as media provider, advertiser, etc.), revenue sharing arrangements, SC provided, desired number of impressions for each piece of SC, etc. Partner database 310 is managed by Partner manager 318.

Supplemental Content Serving Module (SCSM) 320 communicates and transfers SC to system users. For example, SCSM 320 interfaces with the client device to download an interactive commercial to the client. The interactive commercial can be downloaded while the media content is being displayed, or can be downloaded in advance so the client is able to start showing SC without any delay. Supplemental Content Loader Module 322 uploads SC from the network to place it in SC database 306 and make the SC available to users. For example, SC Loader Module 322 can upload a game to SC database 306.

Metadata collector 324 gets metadata information for media metadata database 308. Partner interface 326 interacts with partners for the coordination of retrieval of partner information, SC content provided by partners, accounting, reporting, etc.

Further, Supplemental Content Administrator 328 coordinates the activities related to SC within SC server 302 and interfaces with other modules inside SCSM 320. More details for SC Administrator 328 are shown in FIG. 4, including the flow of information between the different entities.

Figure 4:
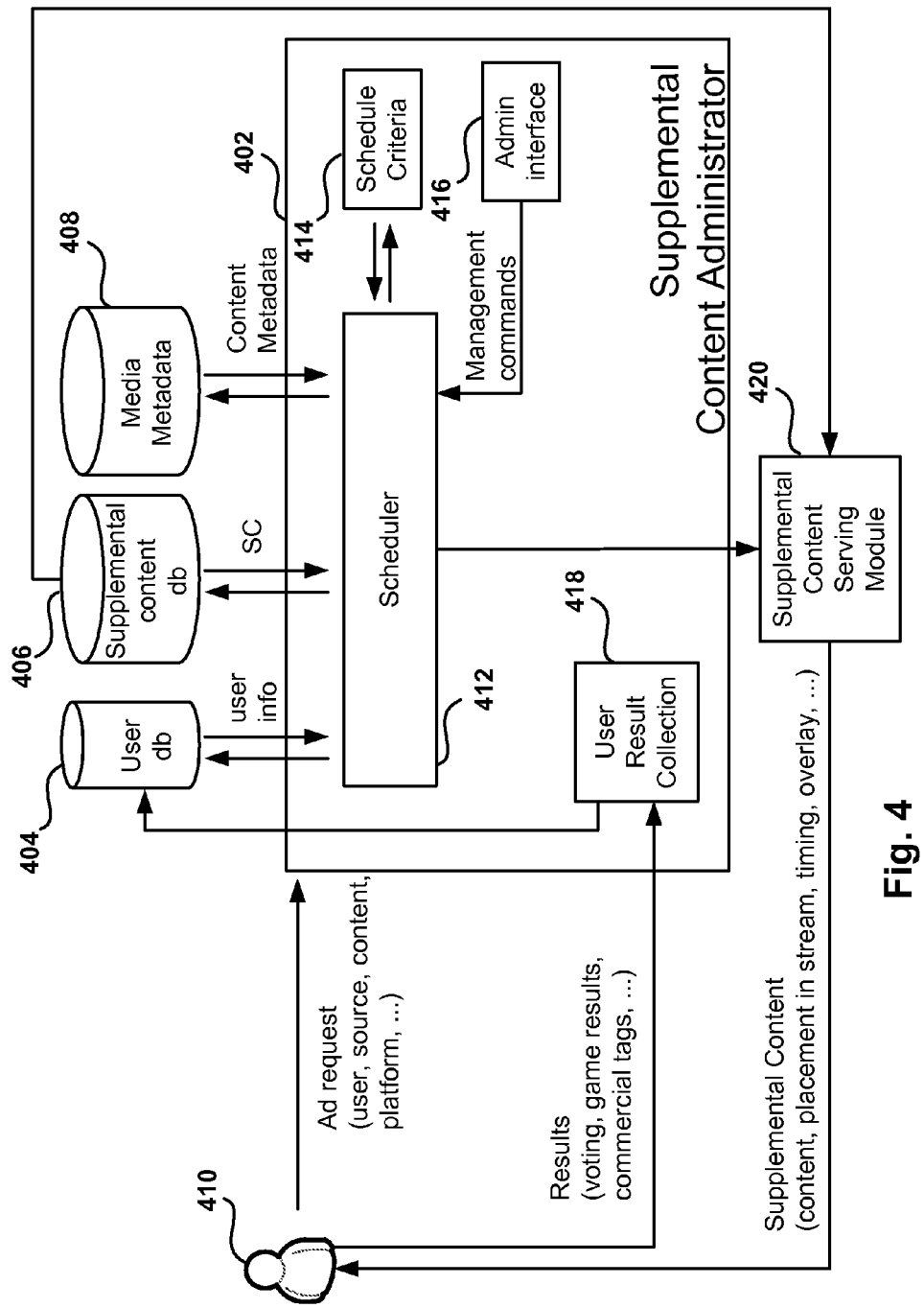
FIG. 4 illustrates the architecture of the Supplemental Content Administrator in accordance to one embodiment.

FIG. 4 illustrates the architecture of the Supplemental Content Administrator in accordance to one embodiment. When user 410 requests a media segment for display in the client system, the client sends an ad request to SC Administrator 402. In another embodiment, the client can receive SC independently from the client request for media, that is, the client system request periodical updates to existing SC stored in the client system in order to download SC to the client to be readily available for presentation to the user.

The ad request may reach SC Administrator 402 via different communication channels, such as the Internet, a telephone modem connection, a satellite connection, a mobile phone network, a private network, etc. The request can be formatted using different protocols, such as html, XML, etc., or it can be formatted using a private protocol established between the client and the SC Server. The request includes information used by SC Administrator 402 to decide which SC to send to the client and the instructions for placement of the SC. The information in the request may include the user id, the client device id, the media content being downloaded, the media server providing the media content, the server downloading the content, the client device platform (PC, PlayStation™ 2, mobile phone, etc.), etc.

Scheduler 412 module inside SC Administrator 402 determines which SC to download and the instructions for placement of the SC. Scheduler 412 can be implemented in software, in hardware or in a combination of software and hardware. Further, Scheduler 412 can be distributed over several modules working in parallel or over multiple distributed servers that process requests from the multitude of users in the system.

The instructions for placement of the SC can include the desired time period for displaying the SC, the placement of the SC in the media segment being displayed, the type of SC being displayed, whether a response is expected from the client, etc. The instructions can be received in the form of formatted plain text, or in a file, or as a downloadable program (such as a Java applet) to be executed at the client, etc.

To determine which SC to serve, Scheduler 412 uses information from schedule criteria module 414, which is described in more detail below in reference to FIG. 5. Schedule criteria 414 can be implemented as a shared data structure, a database, a lookup table, a hardware module, as a program running in the SC server, or as a combination thereof. Scheduler 412 communicates with the SC Server databases, such as user database 404, SC database 406, media metadata database 408, etc. User database 404 provides information about the user attached to the client device, such as age, geography, usage history, preferences, hobbies, purchasing history, SC interaction history, etc. In one embodiment, user database 404 keeps track of the SCs already delivered to the user in order to avoid sending the same SC to the user, or to enable the user to recall a previously viewed SC. For example, a user may decide that she wants to take advantage today of a pizza coupon offered yesterday while watching a movie. The user database may also be used to determine the SC selected, such as sending travel commercials to a travel enthusiast.

SC database 406 stores the SC and can be implemented within a file system in the server, as a distributed database spread out across multiple servers, as part of a Storage Area Network (SAN), etc. SC database 406 is configured to hold different types of content, such as video files, music files, program files, photos, etc. In one embodiment, SC database 406 includes a cache for holding SC being delivered to a large number of users in order to speed up delivery for SC with high delivery requirements. SC database 406 can also have access to external content allowing the downloading of SC from external sources, such as the server of an advertiser that desires the flexibility of changing SC often and the quick dissemination of the SC to the users.

Media Metadata database 408 includes information, also referred to as metadata, about the media available for viewing by the users. The metadata may include sources for the media segments, media format, length of the media segment, type of content, etc. The metadata provided by Media Metadata database 408 can be used by the scheduler to determine the instructions for the SC placement. For example, the metadata may indicate ten appropriate places for placing SC within the media segment, and Scheduler 412 may select two of the ten places for insertion of SC based on the length of the media segment.

In one embodiment, SC Administrator 402 downloads some of the media metadata to remote clients in the background in order to allow remote clients to hold information about media available and how to access it. In yet another embodiment, SC Administrator 402 allows a remote user to browse the media database for finding media.

Once Scheduler 412 determines the SC to be downloaded, Scheduler 412 sends a command to SC Serving Module 420 to send the SC and the instructions to the user. SC Serving Module 420 can be implemented within the same system as SC Administrator 402 or can be implemented as a group of distributed servers. This way, Scheduler 412 may select a SC Serving Module that is geographically close to the user resulting in lower download latency.

In some cases, the delivery of SC at the client device generates results that are sent back to User Result Collection Module 418 within SC Administrator 402. Examples of results collected include voting for a particular event, score obtained after playing an SC game, tags indicating the location of commercials within the downloaded media, etc. The collected results can be stored in user database 404 when they relate back to the user (such as number of points collected in a game), or can be saved in a results database (not shown) that can be accessed by administrators, advertisers, etc., for data analysis.

Administrator interface module 416 provides a user interface to enable the administrator to manage the scheduler. The administrator can enter priorities for the SC, updates to Schedule Criteria 414, instructions to upload new SC or delete old SC, etc.

FIG. 5 illustrates the Ad Delivery Scheduling Criteria according to one embodiment. FIG. 5 shows criteria for scheduling commercial advertising in tabular form. Each ad includes several fields. The Ad Id includes an identifier for the SC, such as McD 11, McD 12, and McD 14, corresponding to commercials for McDonalds. It should be noted that McD 12 includes two entries in the table because commercial McD 12 has two versions, one rated 'G' (for General Audience), and one rated 'R' (for Restricted). The impressions field keeps track of how many impressions are left for delivery of the given commercial. For example, McD 11 has 123,456 impressions left. Each time a user watches McD 11 the impression counter is decreased by one.

The target field identifies the type of user that the ad is targeted for. The targeting can be done by demographics, time of day, etc. For example, McD 11 is targeted to all users, McD 12 with an 'R' rating is targeted to males between the ages of 15 and 25 in California, etc. The trigger field indicates what type of event may cause the display of the ad, such as time of day (8:00 PM to 10:00 PM), a sports event, a certain TV program ("American Idol"), vintage TV programs, etc.

The Platform field indicates what kind of device is delivering the SC. Certain ads may not be suitable for all devices, therefore the delivered SC must be able to be 'played' by the corresponding device. The bandwidth field identifies the type of internet or network communication the client device is using. For example, the device may be using a slow mobile phone connection, or a 6 Mb internet connection.

It should be appreciated that the fields illustrated in FIG. 5 are exemplary. Other embodiments may utilize different fields, may arrange the fields in varying manners, or may encode the fields in a different way. The embodiment illustrated in FIG. 5 should therefore not be interpreted to be exclusive or limiting, but rather exemplary or illustrative.

Figure 6:
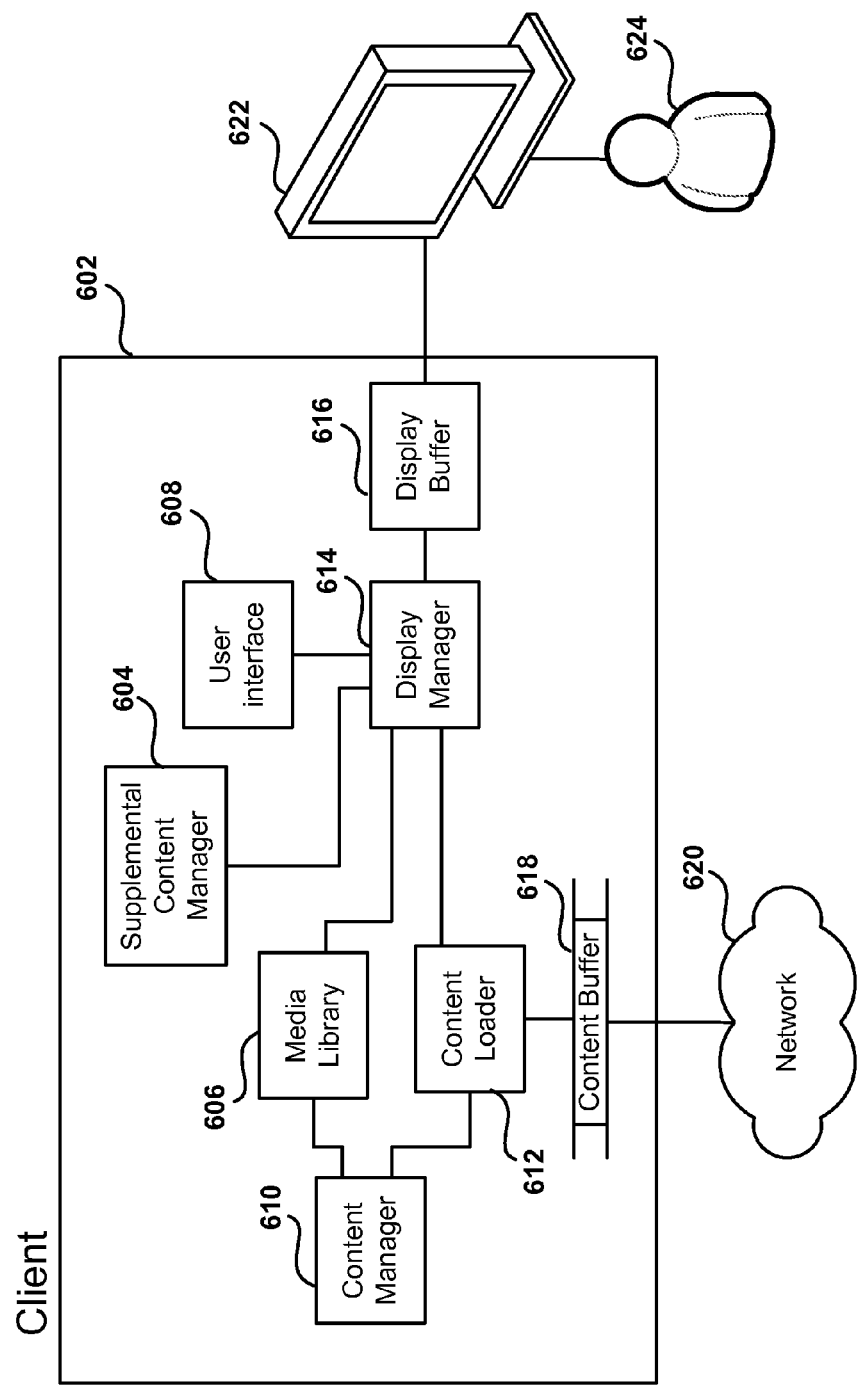
FIG. 6 illustrates the architecture of an embodiment of a client configured to deliver Supplemental Content.

FIG. 6 illustrates the architecture of an embodiment of client 602 configured to deliver Supplemental Content. Content Manager 610 determines how to retrieve content for the user. In one embodiment, the content can be obtained from internal media library 606, or from the Internet via Content Loader 612. Content loader 618 downloads multimedia content via network 620, which is buffered by content buffer 618. Content Loader 612 can retrieve content for storage in the Media Library 606 for later retrieval by the user, offering DVR (Digital Video Recorder) capabilities. One advantage of using the Media Library together with SC Manager 604 is that the SC is added to the media at the time that the media is viewed by the user. Existing DVRs that record a TV program display 'old' commercials when the media is played. For example, if a TV show, including a commercial for another TV show on Tuesday, is recorded on Monday and later viewed on Thursday, the commercial displayed would be obsolete, as the Tuesday TV show being sponsored has already been shown when the user watches the ad on Thursday.

However, by adding SC at the client at the time that the show is viewed, the SC system architecture allows for the replacement of old commercials ('stale') with 'fresh' relevant commercials, thus improving the effectiveness of commercials on viewers. Display Manager 614 receives the media from the Media Library and the SC from the SC Manager and combines them before placing the combination in Display Buffer 616, which drives TV 622. In another embodiment, such as the one described below in reference to FIG. 7, SC Manager performs the combination of media with supplemental media.

Figure 7:
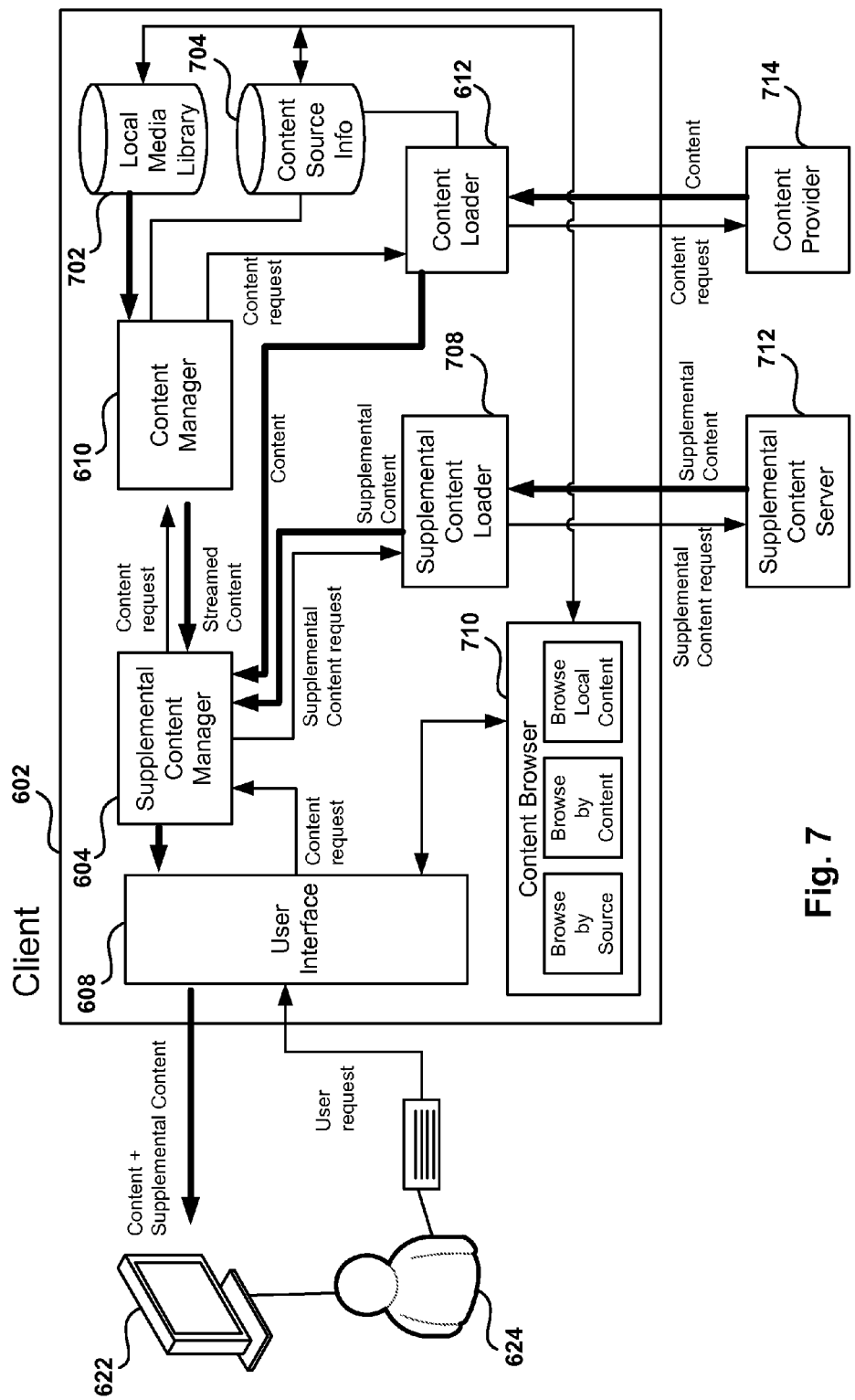
FIG. 7 illustrates further details of the information flow within a client, in accordance with one embodiment.

FIG. 7 illustrates further details of the information flow within a client, in accordance with one embodiment. User 624 enters a content request via user interface 608 to client device 602. User interface 608 can interact with the user in at least one of several ways, such as a keyboard, a mouse, a game controller, signs captured by a camera, a remote control, a phone keyboard, etc. Client 602 can reside in one of many devices, such as a Playstation3, a PC, a laptop, a mobile phone, a set-top box, a computing module inside a TV, etc., or be a dedicated unit for the delivery of multimedia.

User 624 can make specific requests from known sources or may use Content Browser 710 to search for media. The Content Browser includes information regarding locally stored media from Local Media Library 702 as well as information about media available in external servers described in Content Source Information 704. Content Source Information 704 can access other servers with information regarding available media, such as Media Metadata database 408 of FIG. 4, an internet search engine, a media content provider server, etc.

Content Browser 710 allows the user to browse for content in different ways, such as browsing by source of content, by content, by content locally available, etc. The results obtained by the Content Browser 710 are presented in a graphical user interface on display 622.

The user request received by user interface 608 is passed to Supplemental Content Manager 604 which coordinates the loading of the requested content, the loading of SC for supplementing the requested content, and the presentation of the requested content with the SC to the user via display 622. Display 622 can be a PC monitor, a mobile phone display, a browser window within a computer display, etc.

Content Manager 610 checks Content Source Info database 704 to determine whether the content is available in the Local Media Library 702 or in an external Content Provider 714. If the content exists in Local Media Library 702, then Content Manager 610 requests the content from Local Media Library 702 which forwards the content (or information about where the content is located within the server) to SC Manager 604. If the content is external, then Content Manager 610 sends a request to Content Loader 612 which downloads the content from the appropriate Content Provider 714. Once the content is received from Content Provider 714, Content Loader 612 forwards the content to Supplemental Content Manager 604 (or information about the location of the content). Thus, SC Manager 604 receives the content from Content Manager 610 if the content is locally available or from Content Loader 612 if the content has to be downloaded.

With respect to obtaining the SC, SC Manager 604 determines whether SC is locally available, as described below in reference to FIG. 11B, or if the SC must be downloaded from SC Server 712. If the content has to be downloaded, SC Manager 604 sends a request for SC to SC Loader 708 which gets the SC content downloaded from SC Server 712. Once the SC and the instructions are received, SC Loader 708 passes the SC and the instructions to SC Manager 604.

It should be noted, that the operations for obtaining the content and the SC by the SC Manager can be performed in parallel as they are independent. Once the SC Manager 604 knows the media segment which has been requested, SC Manager 604 can request the SC without having to wait for the media segment to be available to the SC. In one embodiment, SC Manager 604 starts displaying SC content downloaded previous to the user request while the content is being buffered. SC Manager 604 may also send a request to the SC Server for a second piece of SC to be displayed with the media content.

Once SC Manager 604 is ready to start displaying the requested content with the Supplemental Content, SC Manager 604 starts sending the combined content and SC to display 622 via user interface 608. It should be noted that it is not required that some of the operations previously described be completed before initiating other operations. For example, SC Manager 604 can start displaying content once the SC Loader 708 indicates that enough content has been buffered to start the showing of the content. In fact, SC may not even be available when content starts being displayed, since there could be a relatively long period of time (such as 5 to 15 minutes) before the SC is needed for display. In fact, if a network or SC Server problem is found, SC Manager 604 may decide not to show the SC and deliver only the requested content to the user.

It should be appreciated that the embodiments illustrated in FIGS. 3-7 are exemplary architectures for SC client and server. Other embodiments may utilize different modules, or utilize modules that are a combination of those presented, or further divide the described modules into separate modules, as long as the principles presented herein are implemented. Additionally, some of the modules may be distributed along a plurality of modules cooperating together for delivery of the described functionality. The embodiments illustrated in FIGS. 3-7 should therefore not be interpreted to be exclusive or limiting, but rather exemplary or illustrative.

FIGS. 8A-B picture embodiments for the placement of supplemental content within a video stream. FIGS. 8A-B depict a series of video frames downloaded from a media provider. The media provider can provide information regarding the location of commercials, or spots for placing SC at the client, with information in the video data itself or with metadata information in an out-of-band channel.

FIG. 8A includes a mark in a video frame that shows that a spot for a commercial or SC is coming in the following third frame. Other embodiments may include the mark in different frames, such as on the frame corresponding to the commercial itself, 10 frames ahead, etc. FIG. 8B illustrates how metadata, downloaded in parallel or simultaneously with the video content, indicates where the spots of interest for commercials or SC are. The out-of-band channel can be transmitted together with the video data, or in a separate channel. Identifiers within the video data enable the metadata to identify where the spots of interest are.

Figure 9A:
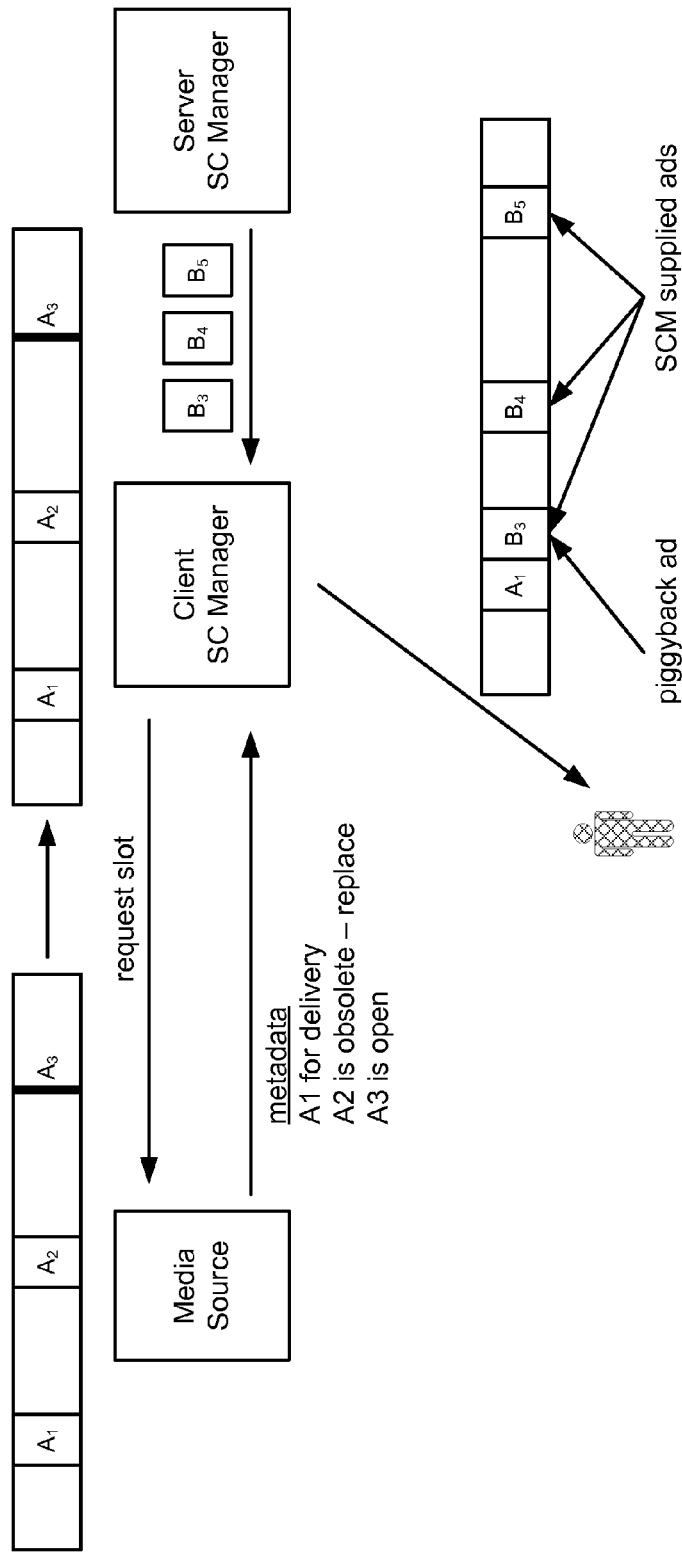
FIGS. 9A-B illustrate how the SC manager at the client combines media content with supplemental content, according to one embodiment.
Figure 9B:
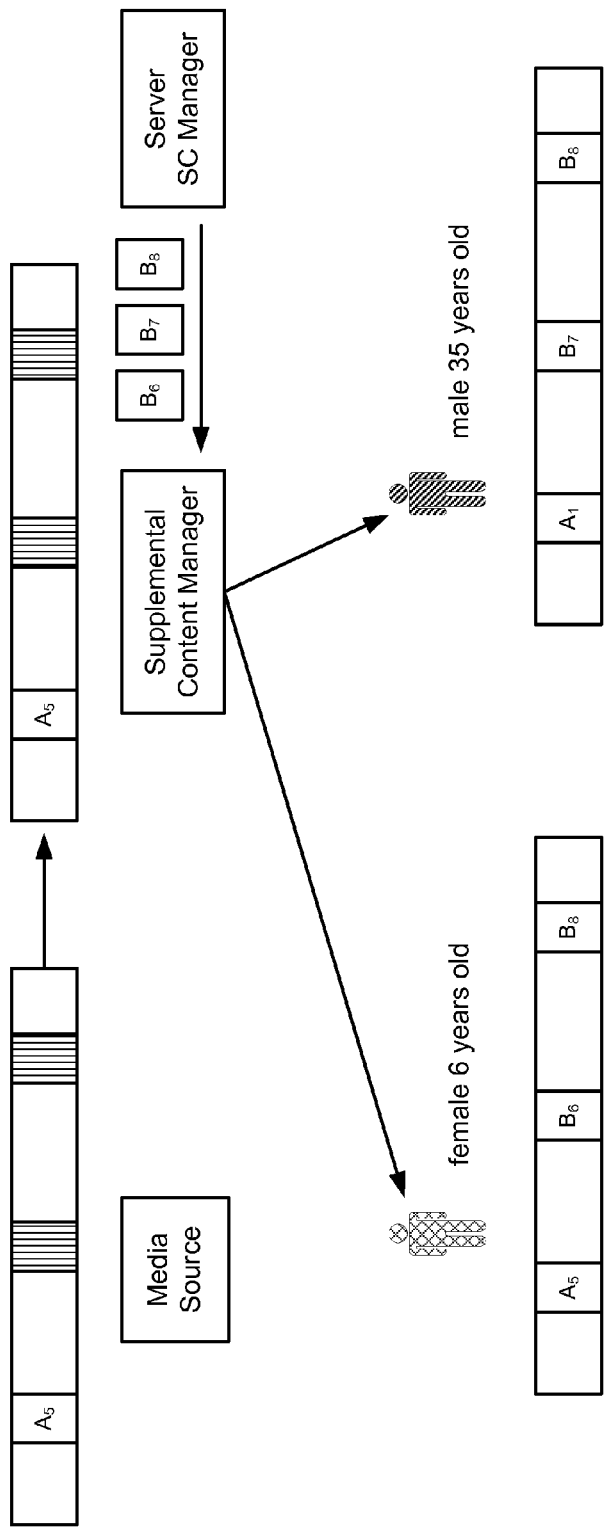

FIGS. 9A-B illustrate how the SC manager at the client combines media content with supplemental content, according to one embodiment. Referring to FIG. 9A, the Client SC Manager requests a slot from the media source to include SC. The Media Source delivers content with ads $A_1$ and $A_2$, and an open slot $A_3$, also referred to herein as insertion windows, for placement of SC by the Client SC Manager. Simultaneously, the Media Source sends metadata to the Client SC Manager that indicates that slot $A_1$ is for direct delivery to the user without modification, that slot $A_2$ contains an ad that is obsolete and can be replaced with SC, and that slot $A_3$ is open for insertion of additional SC.

The Server SC Manager sends SC to the Client SC Manager. The transmission of SC $B_3$, $B_4$, and $B_5$ can be done in advance of requests by the user for media, or simultaneously with the download of content from the Media Source, or after the media has been downloaded to the client. In the embodiment shown in FIG. 9, the Client SC Manager inserts a piggyback SC $B_3$ after $A_1$, and SCs $B_4$, $B_5$ in insertion windows $A_2$ and $A_3$, respectively.

In another embodiment, the addition of SC content is not coordinated with the media source. This way, SC can always be added to downloaded content, independently of where the content is originated. The SC manager can for example introduce SC before displaying the content, or in the middle of the content delivery, although the Client SC Manager will need additional processing to determine how to introduce the SC at a proper time. Some of these methods include detecting fades to black or other kinds of fades, periods of silence, variations in sound properties (typical of commercial spots), metadata information on the content, etc. Illustrative methods for determining how to detect commercials in content are described below in reference to FIGS. 17A-B.

FIG. 9B depicts how to introduce SC according to demographics. Two different users are downloading content simultaneously, a 6-year old girl, and a 35-year old male. The content may be identical or may be different, may be from the same source or from a different source. The Supplemental Content Manager inserts SC $B_6$ and $B_8$ for the girl, and $B_7$ and $B_8$ for the male. SC Manager uses the Ad Delivery Scheduling Criteria, as previously described in reference to FIG. 5, to determine which SC to deliver. In this case, $B_8$ is suitable for all ages, while $B_6$ is targeted to children and $B_7$ is targeted to males over 30.

Figure 10:
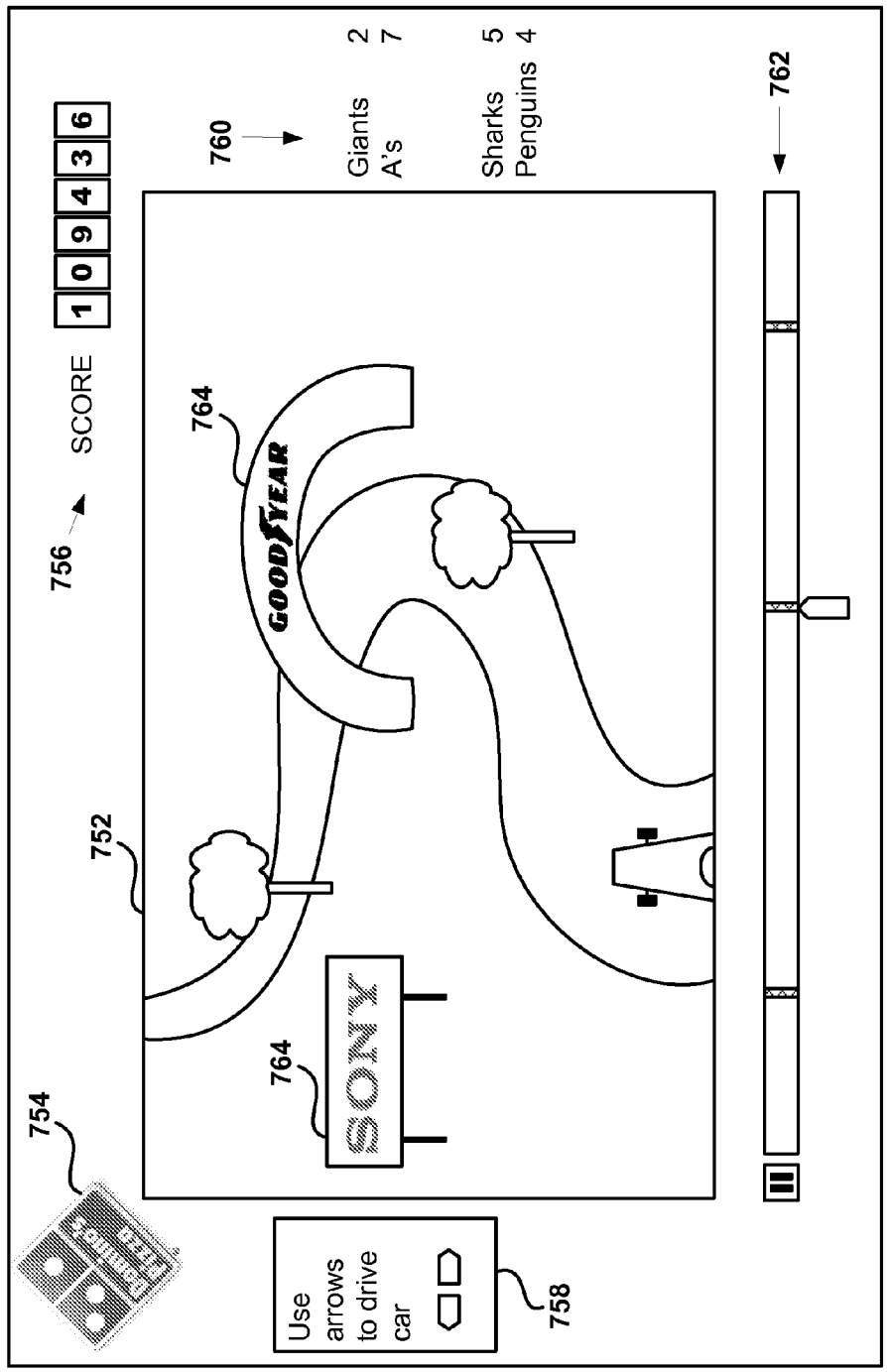
FIG. 10 depicts an embodiment of user interface for displaying media content and supplemental content.

FIG. 10 depicts an embodiment of user interface for displaying media content and supplemental content. The user interface of FIG. 10 includes a multimedia display area 752 for displaying video, filler video for music, a game display, email, a browser, etc. Multimedia display area 752 can include embedded section 764 for displaying commercial advertisement or any other kind of supplemental content. Embedded section 764 can be a predefined section of the multimedia display area 752, a rolling banner, a moving area within the display, etc.

Additional information is made available to the user by the client device outside multimedia display area 752 such as commercial advertisement section 754, game information section 758, game score 756, news and scores 760, etc. Further, display information bar 762 provides details about the progress of the multimedia display, control buttons (pause, etc.), location of SC insertions, etc. In one embodiment, the SC being displayed is an interactive game. The user has the option of playing for the minimum amount of time allotted for the display of the SC or the option of continuing to play the game until the user makes an input to command the end of the game and the return to the multimedia display.

It should be appreciated that the embodiment illustrated in FIG. 10 is an exemplary layout for displaying media. Other embodiments may utilize different layouts, or may add other related fields. The embodiment illustrated in FIG. 10 should therefore not be interpreted to be exclusive or limiting, but rather exemplary or illustrative.

Figure 11A:
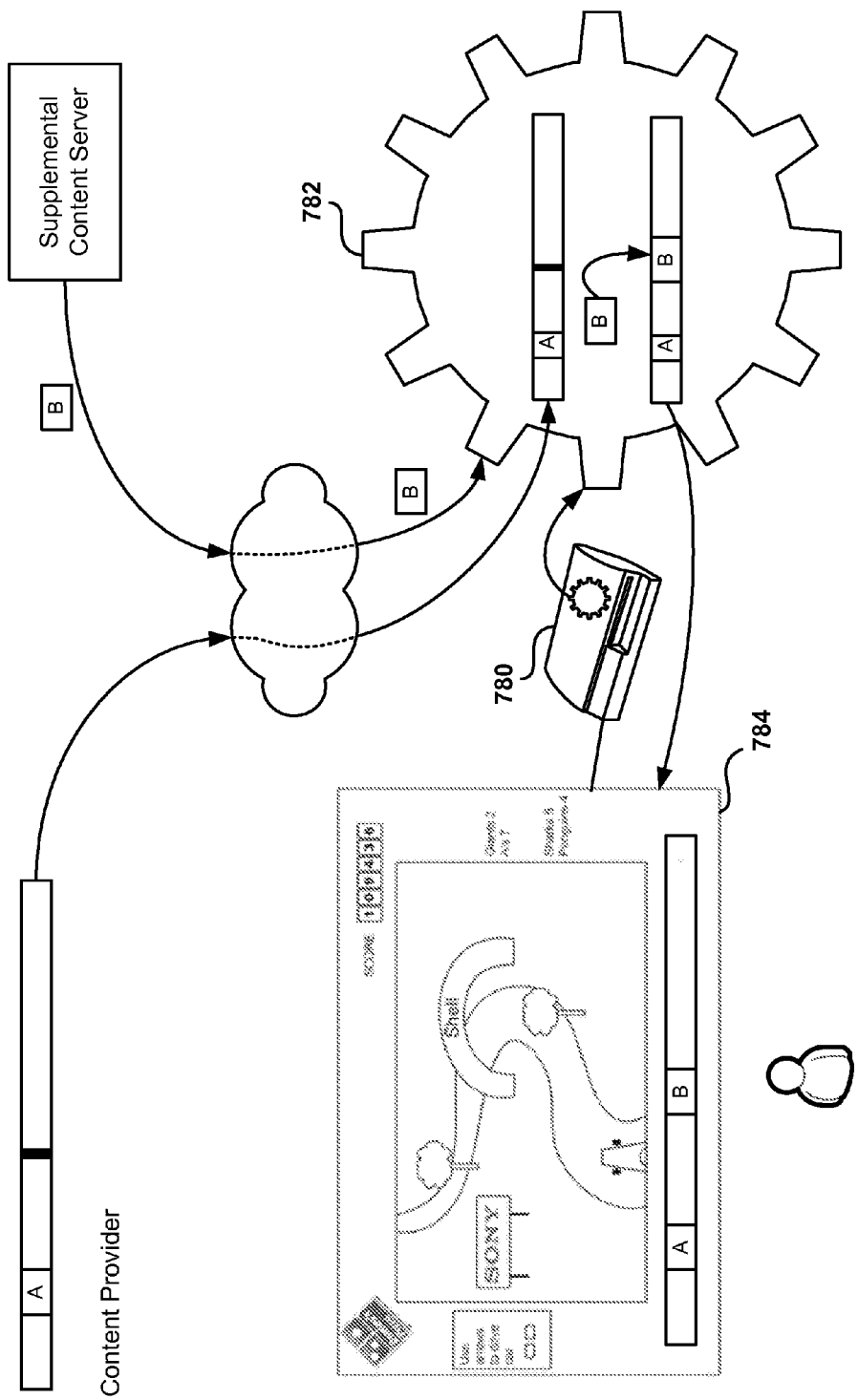
FIGS. 11A-B illustrate how supplemental content is inserted at the client, in accordance with one embodiment.
Figure 11B:
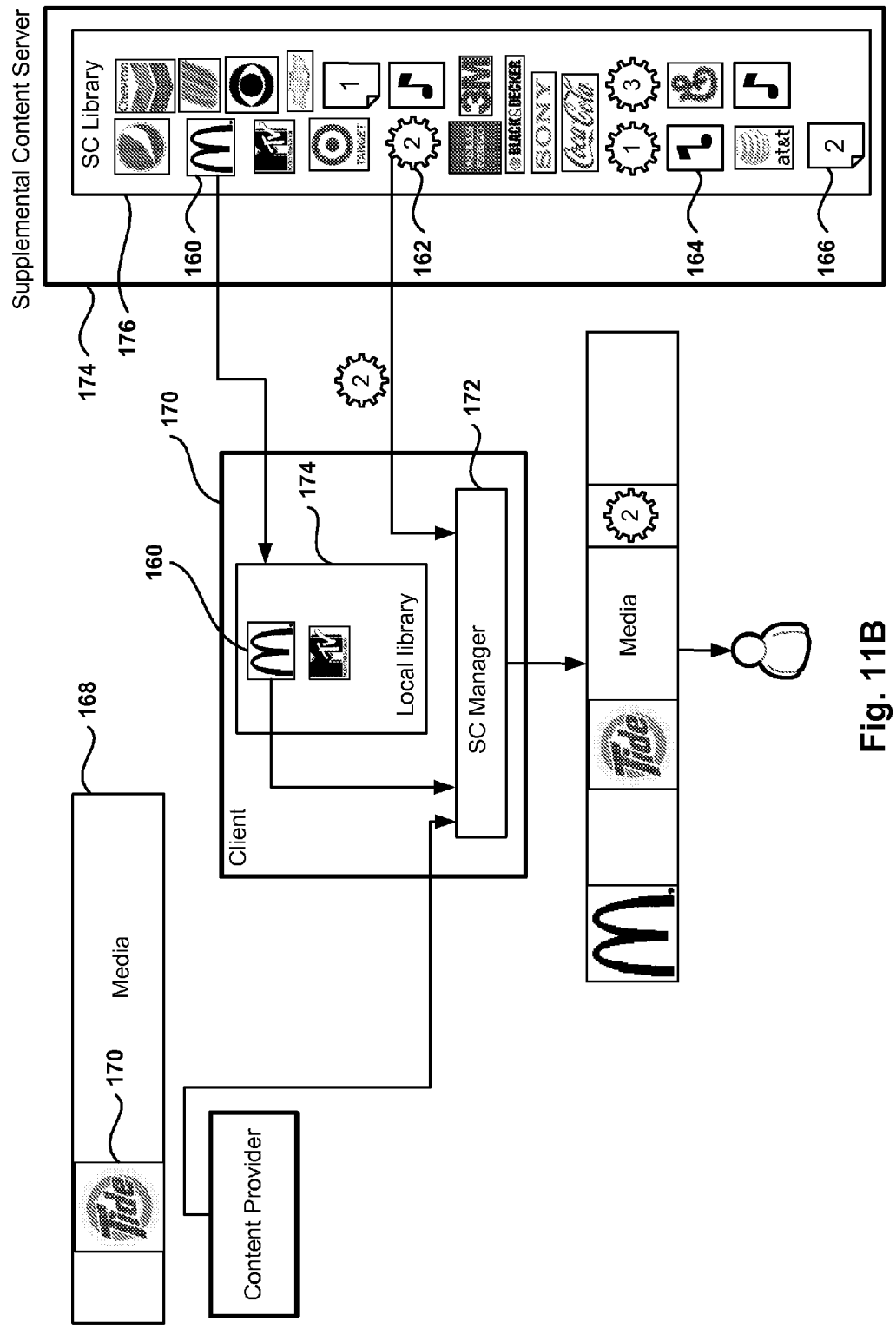

FIGS. 11A-B illustrate how supplemental content is inserted at the client, in accordance with one embodiment. FIG. 11A shows how SC Manager 782 in client device 780 downloads content from a content provider and SC B from SC Server. SC Manager 782 adds SC B to the media downloaded from the content provider before showing it to the user in display 784.

In the embodiment shown in FIG. 11B, media 168 is downloaded from the content provider to client device 170. Downloaded media 168 includes a promotional message 170 (for Tide™ detergent). Supplemental Content Server 174 includes library 176 with several types of SC such as video commercial 160 (for McDonalds™), interactive program 162, music 164, photo or document 166, etc. SC Server 174 downloads SC to local library 160 on-demand or as a background task. The content is downloaded on demand when the SC Manager detects a media request by the user. The SC Manager then determines what kind of SC to download for display with media 168. Additionally, SC Manager 172 downloads SC on the background, independent of a user media request, so SC is instantaneously available when SC needs to be displayed. For example, locally stored SC in local library 160 can be shown immediately to the user after a request while the user is waiting for the media content to be buffered for display.

In the example shown in FIG. 11B, SC Manager 172 adds SC 160 before the display of the content to the user. Additionally, SC Manager 172 downloads SC program 162, an interactive game, and inserts SC program 162 in the media stream shown to the user.

Figure 12:
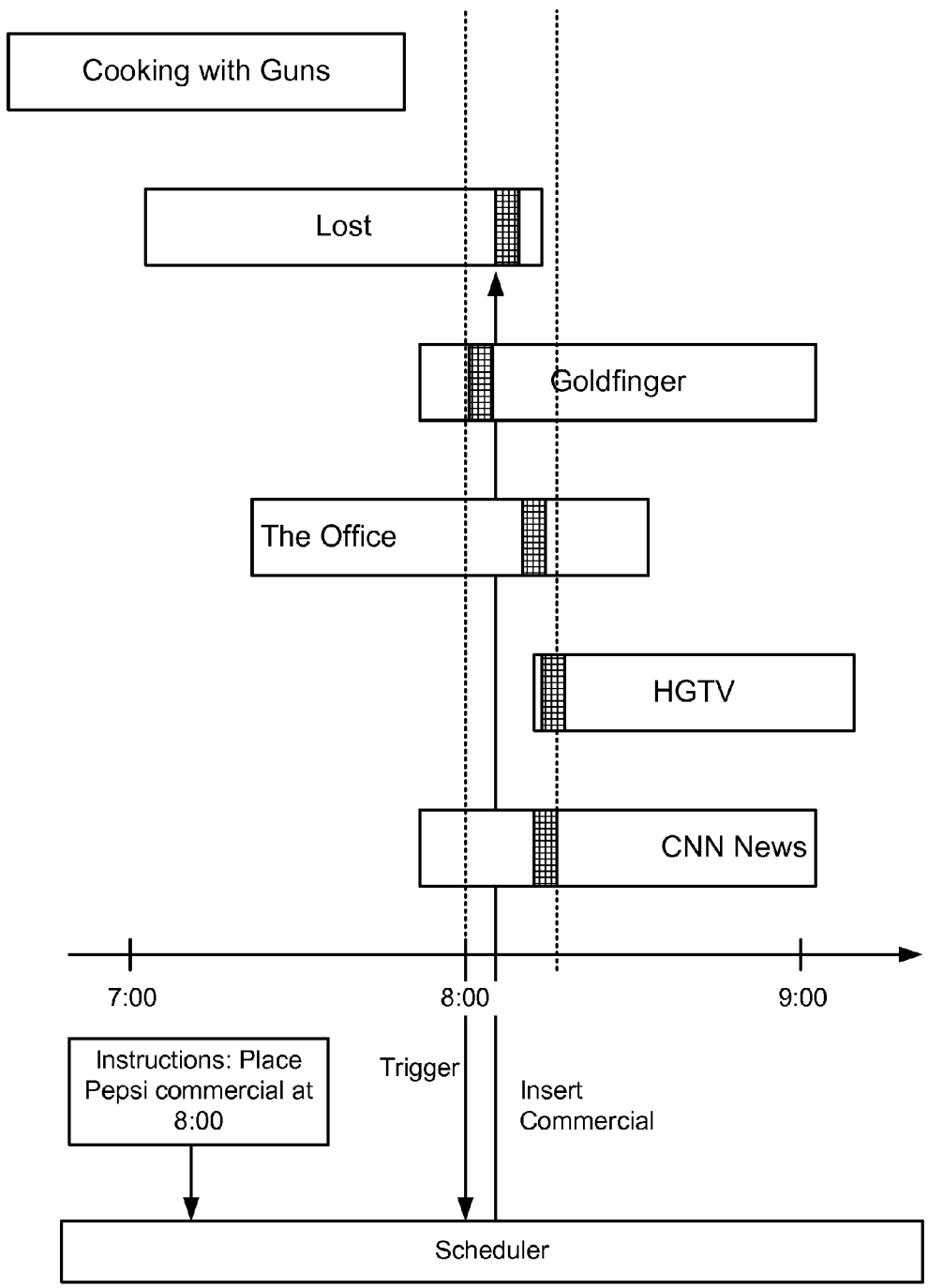
FIG. 12 illustrates an embodiment for placing supplemental content at a predefined time in a multitude of user displays.

FIG. 12 illustrates an embodiment for placing supplemental content at a predefined time in a multitude of user displays. SC Server has determined that the same SC is going to be inserted in all users currently connected at 8:00 PM. In one embodiment, the SC sends instructions to clients to insert the content at the most appropriate time within a period of time around 8:00 PM. In the embodiment shown in FIG. 12, the period of time is between 8:00 PM and 8:15 PM. The user watching "Cooking with Guns" will not see the SC because the display of the show ends before 8:00 PM. The user watching "Lost" will see the content inserted towards the end of the show because the show is about to end before 8:15. In similar fashion, users watching "Goldfinder", "The Office," "HGTV," and CNN News will be shown the SC when the method determines the best moment for inserting the SC.

Figure 13:
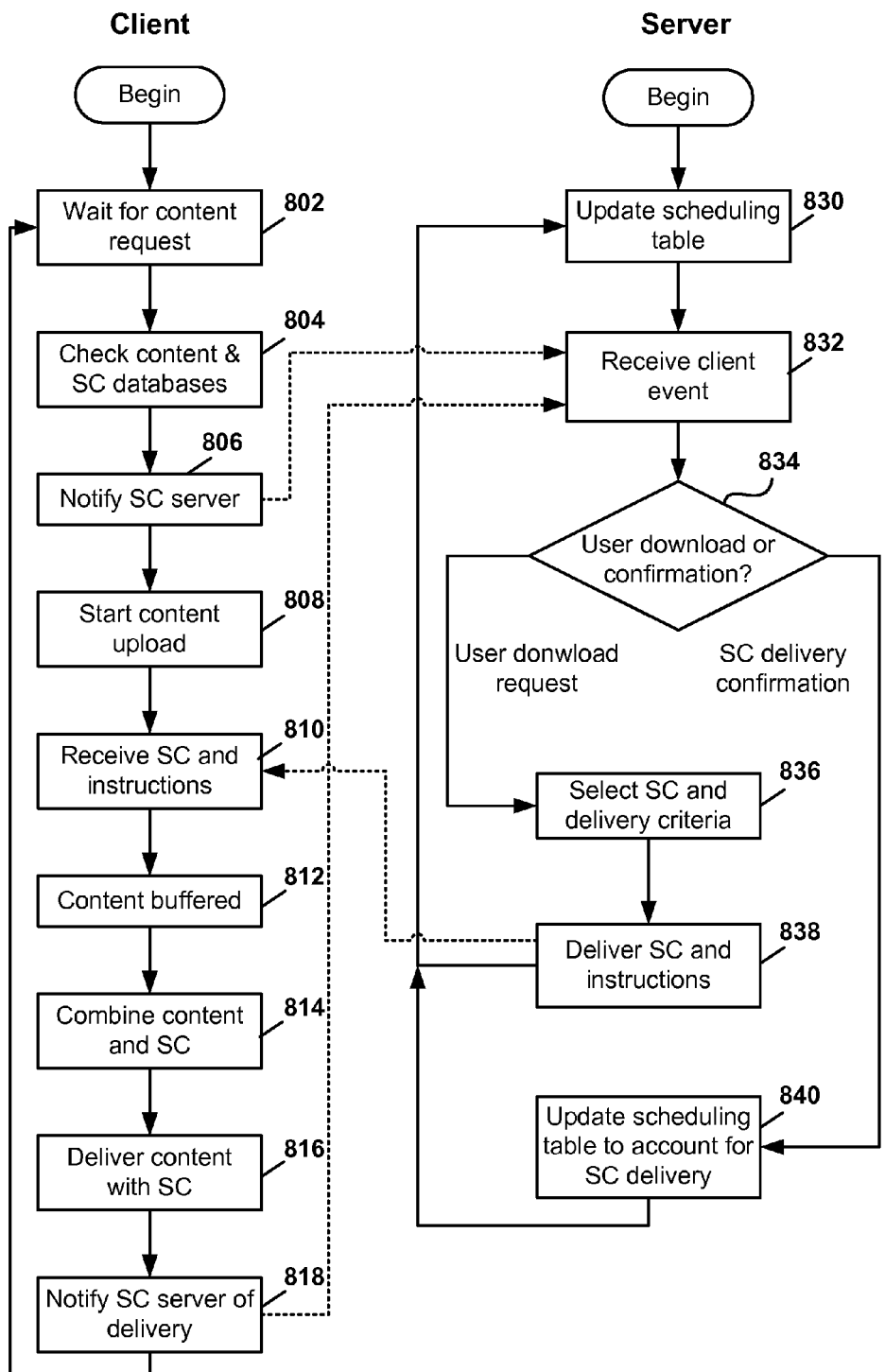
FIG. 13 shows process flows at client and server for downloading and presenting SC, according to one embodiment.

FIG. 13 shows process flows at client and server for downloading and presenting SC, according to one embodiment. On the client side, the SC Manager waits for content requests in operation 804. Once a content request is received, the content and the SC databases are check to determine where is the media available and what SC will be added to the media segment. In operation 806, the client sends a notification of the user request to the SC server.

The content download starts in operation 808. Additionally, the client receives SC and instructions for placement of the SC from the server in operation 810. In operation 812, the client waits until enough content has been buffered so display of the media can start. The buffered content and the SC is combined in operation 814 before the content is delivered to the user in operation 816. Once the SC has been consumed by the user, the client notifies the server in operation 818 to allow the server to perform maintenance operations, such as increasing the number of impressions delivered for the SC. After operation 818 the method flows back to operation 802 to wait for the next content request.

On the server side, the SC Manager updates the scheduling table in operation 830 according to previous partner requests, SC already delivered, user profiles, etc. In operation 832 the server waits until it receives a client event, which may include a user notification of a media request or the completion of delivery of previously downloaded SC. In operation 834 the client analyzes the event received, and in the case of a user download request the method continues to operation 836 and if the event is an SC delivery confirmation, then the method proceeds to operation 840.

In operation 836, the server selects the type of SC to be delivered and how the SC will be delivered. The method continues to operation 838 where the SC and the instructions for delivery are sent to the client device. In operation 840, the server updates the scheduling table as a result of the successful SC delivery and then the method flows back to operation 830.

It should be understood that the operations described in FIG. 13 are exemplary and other embodiments may perform operations in different order, or some operations in parallel, or some operations may be skipped. For example, the content download operation 808 can be performed before the SC is notified in operation 806, or operation 818 is omitted to notify the server of successful SC delivery because the server assumes SC is always successfully delivered in order to simplify processing.

Figure 14:
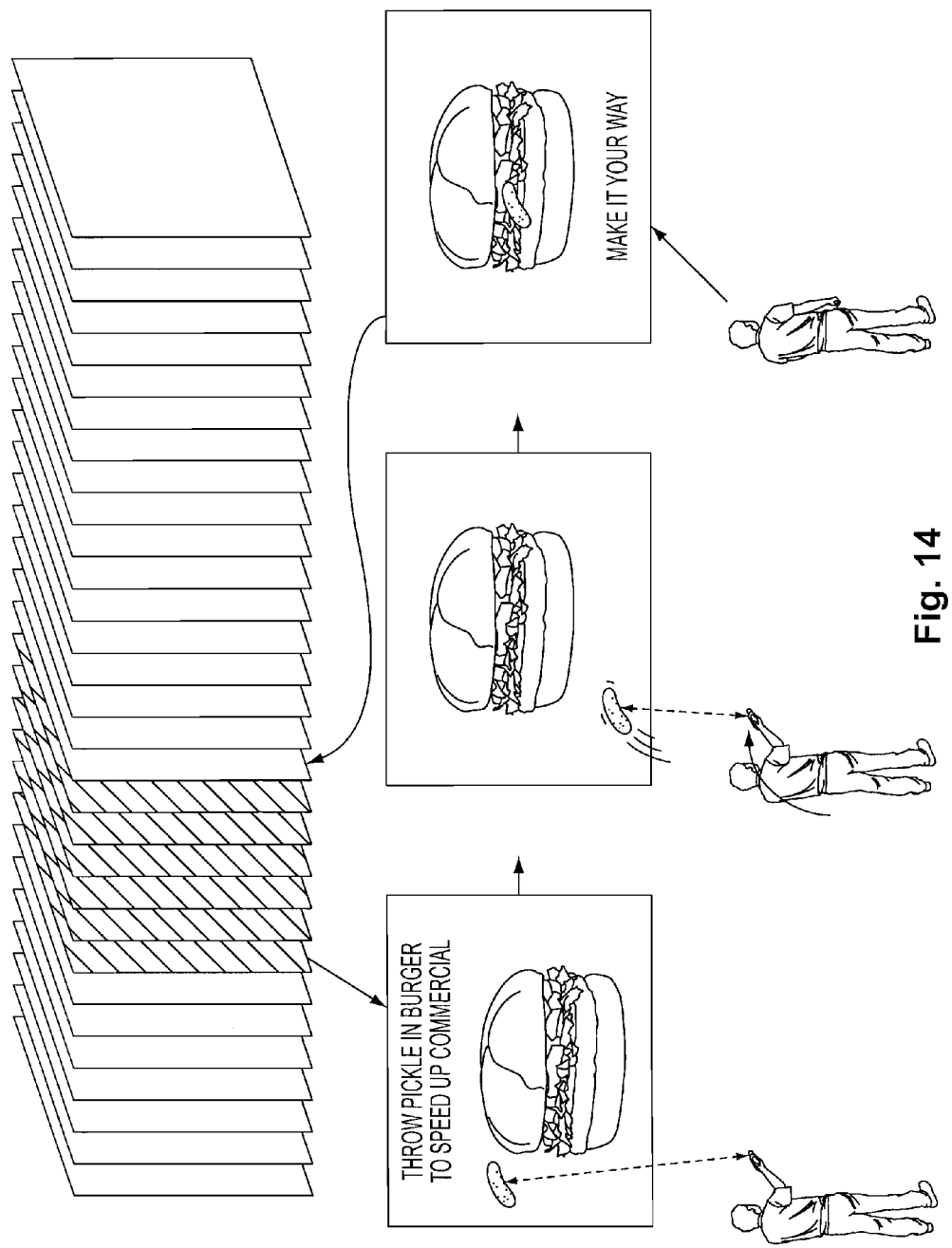
FIG. 14 illustrates the operation of an interactive commercial in accordance with one embodiment.

FIG. 14 illustrates the operation of an interactive commercial in accordance with one embodiment. At the beginning of the interactive commercial, instructions are shown to the user to interact with the commercial. In the embodiment of FIG. 14, the instructions are "Throw the pickle to speed up commercial." The user, which is holding a one-handed controller with motion detection, swings his arm to simulate the act of throwing a pickle. Finally, the pickle is placed in the burger, and commercial message "Make it your way" is displayed briefly before the commercial ends and the user returns to watching regular media.

Figure 15:
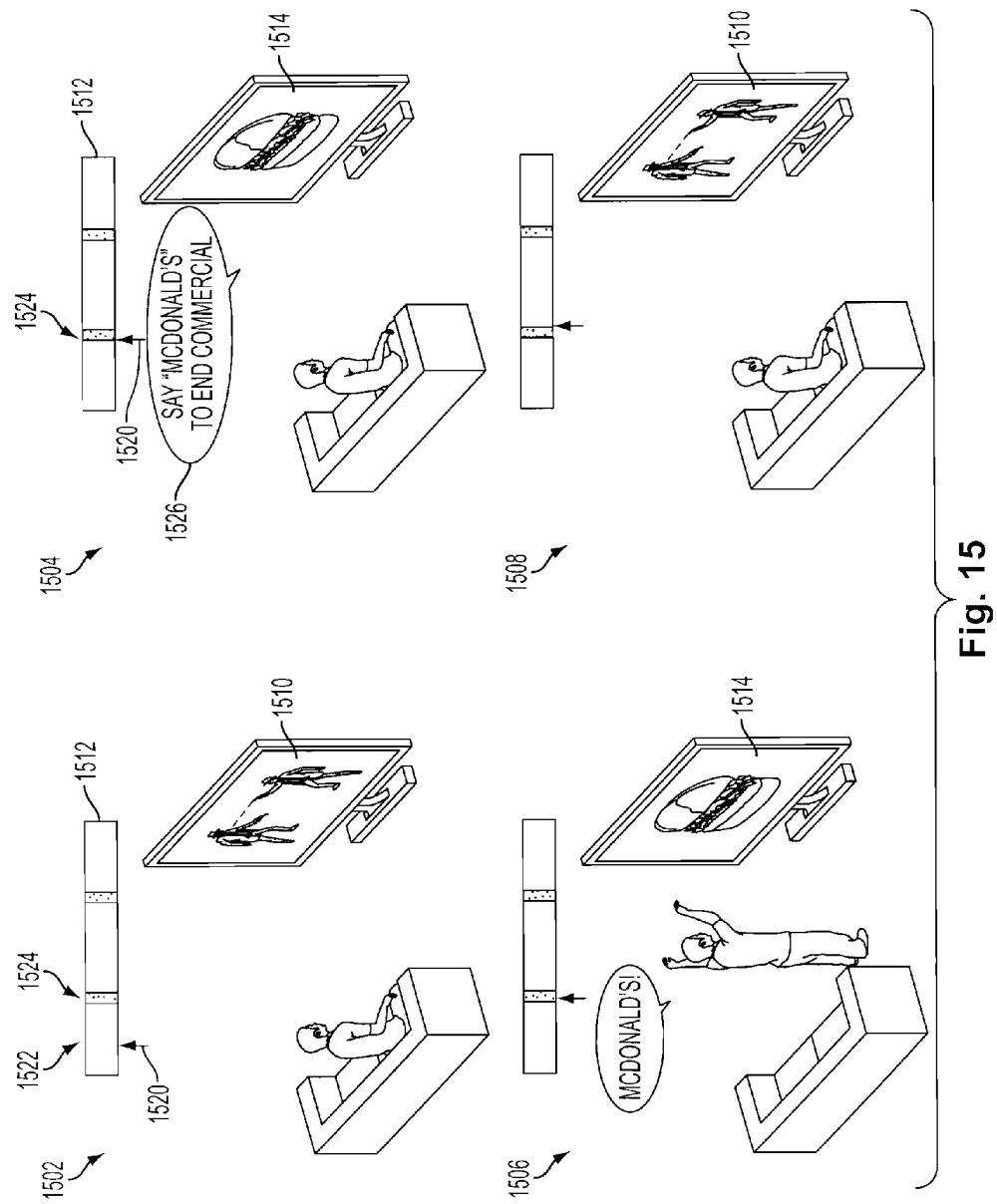
FIG. 15 illustrates a user interacting verbally with a commercial, according to one embodiment.

FIG. 15 illustrates a user interacting verbally with a commercial, according to one embodiment. In first capture 1502 of the sequence, a user is watching movie 1510. Progress pointer 1520 in progress bar 1512 shows that content 1522 display corresponds to a movie and that break 1524 is approaching. On second capture 1504, progress pointer 1520 shows that the movie has progressed to break 1524 for placing SC 1514. SC 1514 is interactive and instructions 1526 from the display ask the user to 'Say "McDonalds" to end commercial.' On third capture 1506, the user is saying "McDonalds!" The client device includes a microphone that captures the user's words and voice recognition on the device determines that the user has responded and then proceeds to skip the rest of the commercial, as shown on fourth capture 1508, where the user goes back to watch the movie. In one embodiment, the user gets rewarded with some points or a coupon for McDonalds.

Figure 16:
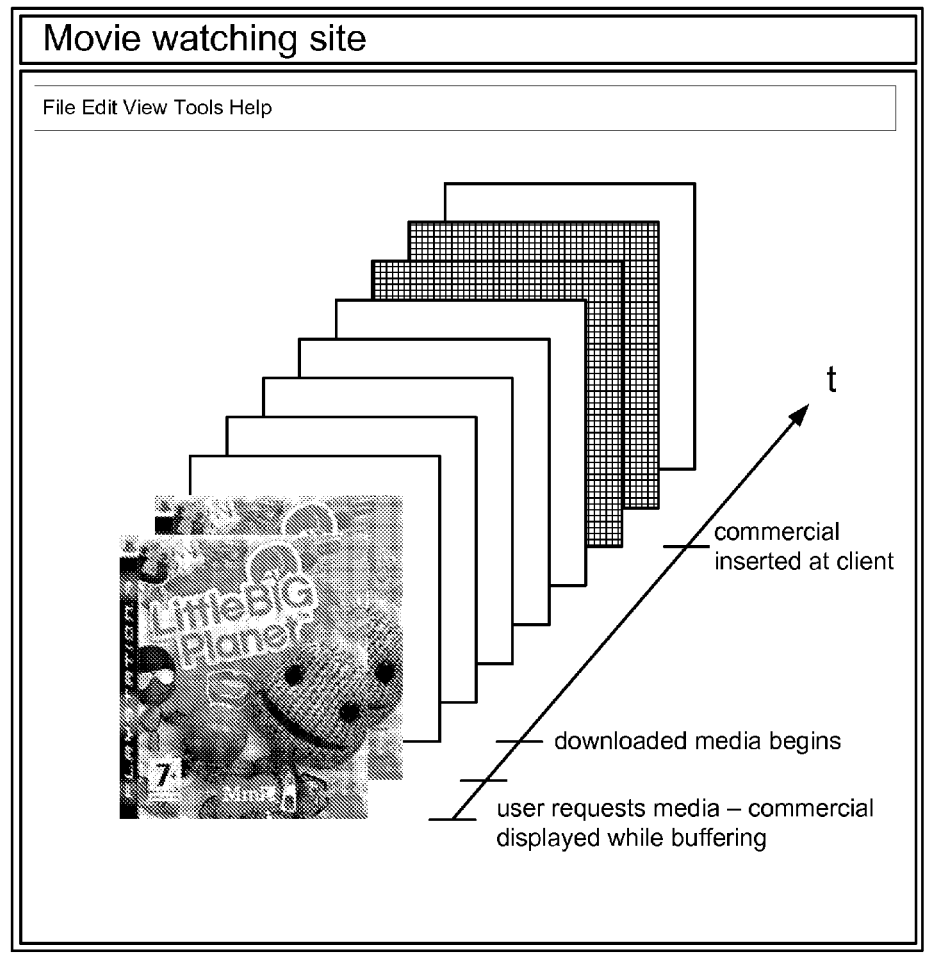
FIG. 16 depicts the placement of supplemental content starting at the moment the user requests a media download.

FIG. 16 depicts the placement of supplemental content starting at the moment the user requests a media download. FIG. 16 shows a multimedia stream displayed to the user. At the time that the user requests the media, and advertisement is shown to the user. The advertisement has been previously downloaded to the client and is ready to be displayed without having to wait for the SC download. Following the initial advertisement, the downloaded media begins display and later on a second form of SC is inserted again at the client.

Figure 17A:
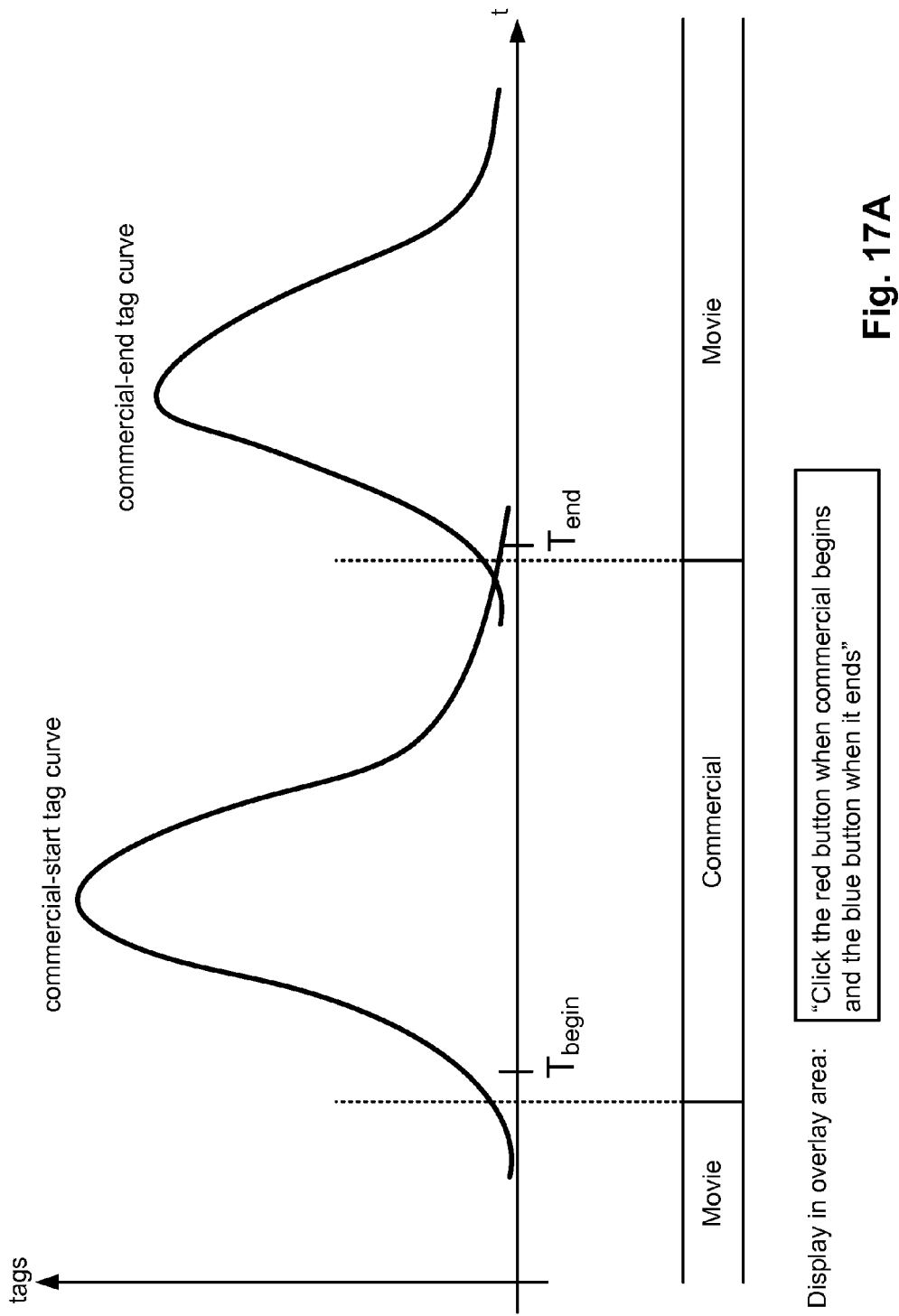
FIGS. 17A-B illustrate embodiments for collecting user input to determine the beginning and end of commercials in a displayed video stream.
Figure 17B:
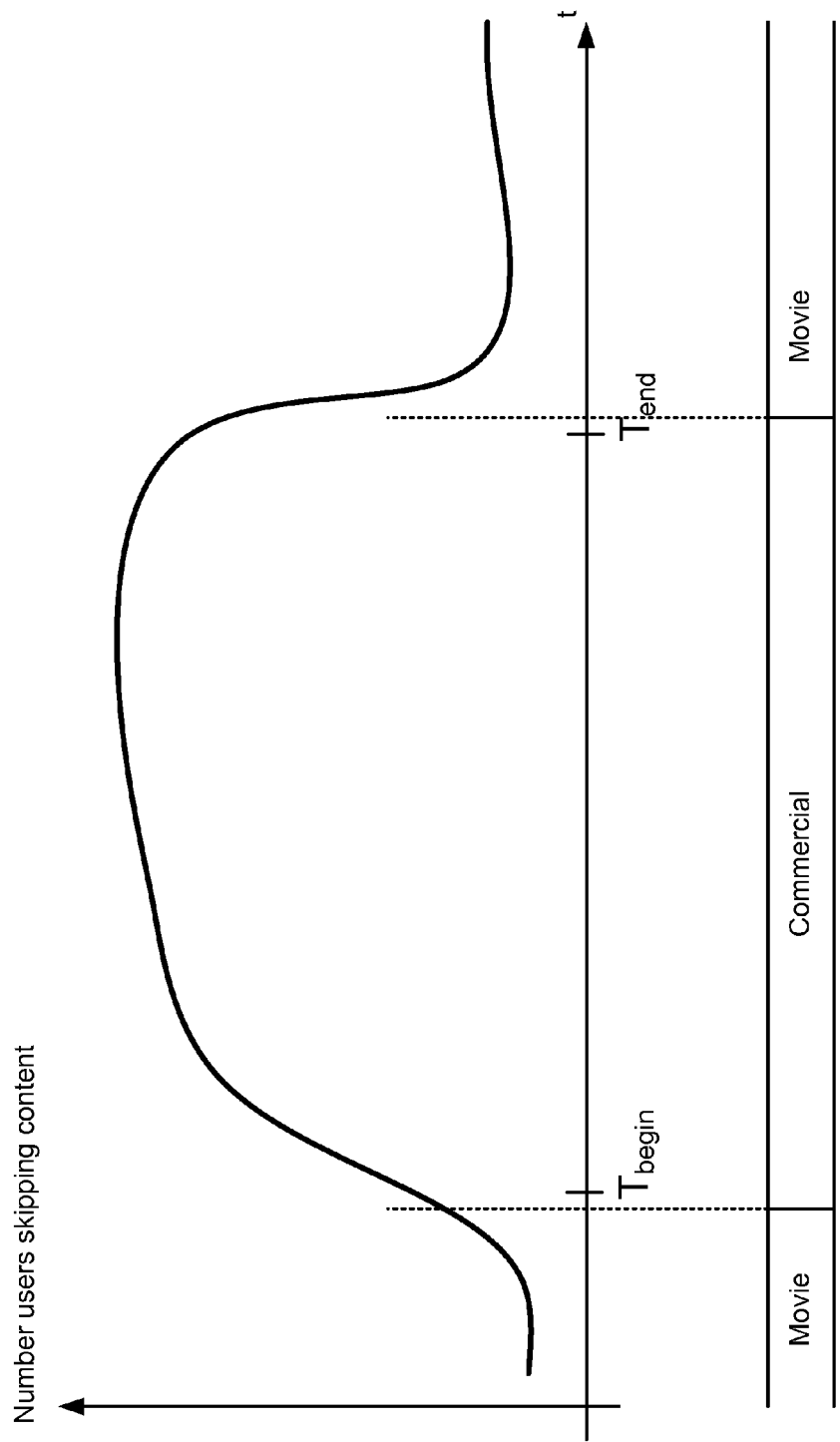

FIGS. 17A-B illustrate embodiments for collecting user input to determine the beginning and end of commercials in a displayed video stream. In FIG. 17A, users are provided with a way to cooperate with the system to identify the beginning and ending of commercial breaks for content, which may be broadcast media such as a TV show. As the commercial begins, users provide an input (pressing the red button) and information is sent to the SC server indicating the flagged location within the media. Similarly, the user provides a different input (pressing the blue button) to flag when the commercial has ended.

Data from a plurality of users is collected by the SC server. The commercial-start tag curve shows the distribution of the number of users that have identified a certain moment in time as the beginning of the commercial. Heuristics at the server determine the approximate time $T_{begin}$ where the commercial is estimated to have begun, taking into consideration user response times, and possibly other factors such as fades to black, change of sound levels, etc. Similarly, $T_{end}$ is estimated for the end of the commercial. The information can then be used later on to inform other users where the commercials are, such as for those users using a DVR to record the show. In addition, the SC client can use this information to insert a new commercial before or after the broadcasted commercial, or to replace the broadcasted commercial with a new one.

FIG. 17B is used to identify the location of commercial by identifying when users fast forward over content when watching the media from a DVR or media that has been buffered. Data from a plurality of users is collected and those segments where a large number of viewers are using the fast forward feature are considered locations of commercials. Heuristics at the server take into account normal user behavior where users may take some time to respond to the commercial by reaching for the remote, finding the fast-forward button, etc. Similarly, users may tend to fast forward past the end of the commercial until they recognize the show being watched.

FIG. 18 shows process flow 1800 for delivering supplemental content within streamed media in accordance with one embodiment of the invention. In operation 1802, a request for a media segment is received at the client, where the media segment includes a plurality of video frames. In operation 1804, the stream of the media segment is downloaded to the client from a media server. The supplemental content (SC) can be accessed from storage in the client or from an SC server. Further, the SC can be accessed before receiving the request in operation 1806a, or while obtaining the stream in operation 1806b, or after the stream has been downloaded in operation 1806c.

The person skilled in the art will readily appreciate that some clients will access the SC before the request, while others may access the SC while buffering the stream from the media server, etc. Further, some clients will combine operations 1806a-c and present SC to the user that has been downloaded before a request has been generated (while buffering the media for example), and some SC that is downloaded simultaneously with the buffering of the streamed media.

Once the segment and the SC are obtained, the media segment is combined with the SC at the client in operation

1808. Combining the segment and the SC includes inserting the SC to add or augment the video frames from the streamed media segment. In operation 1810, the combination of media segment and SC is displayed to the user.

In one embodiment, the system for delivering a supplemental content with stream media can be defined by a plurality of structural elements that perform specific means. In one embodiment, the means for receiving a request can be embodied in a communication channel such as defined by software for hardware. The communication channel may be connected through storage that receives the media segment and stores the media segment for processing in accordance with the storage format. The means for receiving can also be defined as a connector to the internet, and can be embodied in a specific appliance.

The means for obtaining a stream can be coupled to the means for receiving the request. The means for obtaining the stream can be defined by a piece of hardware or software that is integrated within an appliance. The appliance can be a set-top box, a television, or other device that communicates with the internet, such as a computer. The means for accessing supplemental content from storage can be defined as a memory access module that enables mapping to the storage for accessing the specific supplemental content that is stored locally or over the internet.

The means for combining the media segment can include software or firmware that is used to combine specific pieces of supplemental content and media that is being obtained through the stream. The combining can be in the form of a mapping algorithm that enables specific insertion of frames, overlays, or data within specific media frames or segments. The means for combining can still be further embodied in a specific piece of code that is then mapped to a specific piece of hardware or firmware. The means for displaying can be defined as a specific display means such as a computer screen, a display screen on a portable device, or any other viewable display that is coupled to, associated with, or integrated with the system for delivering the supplemental content within the stream media.

Figure 19:
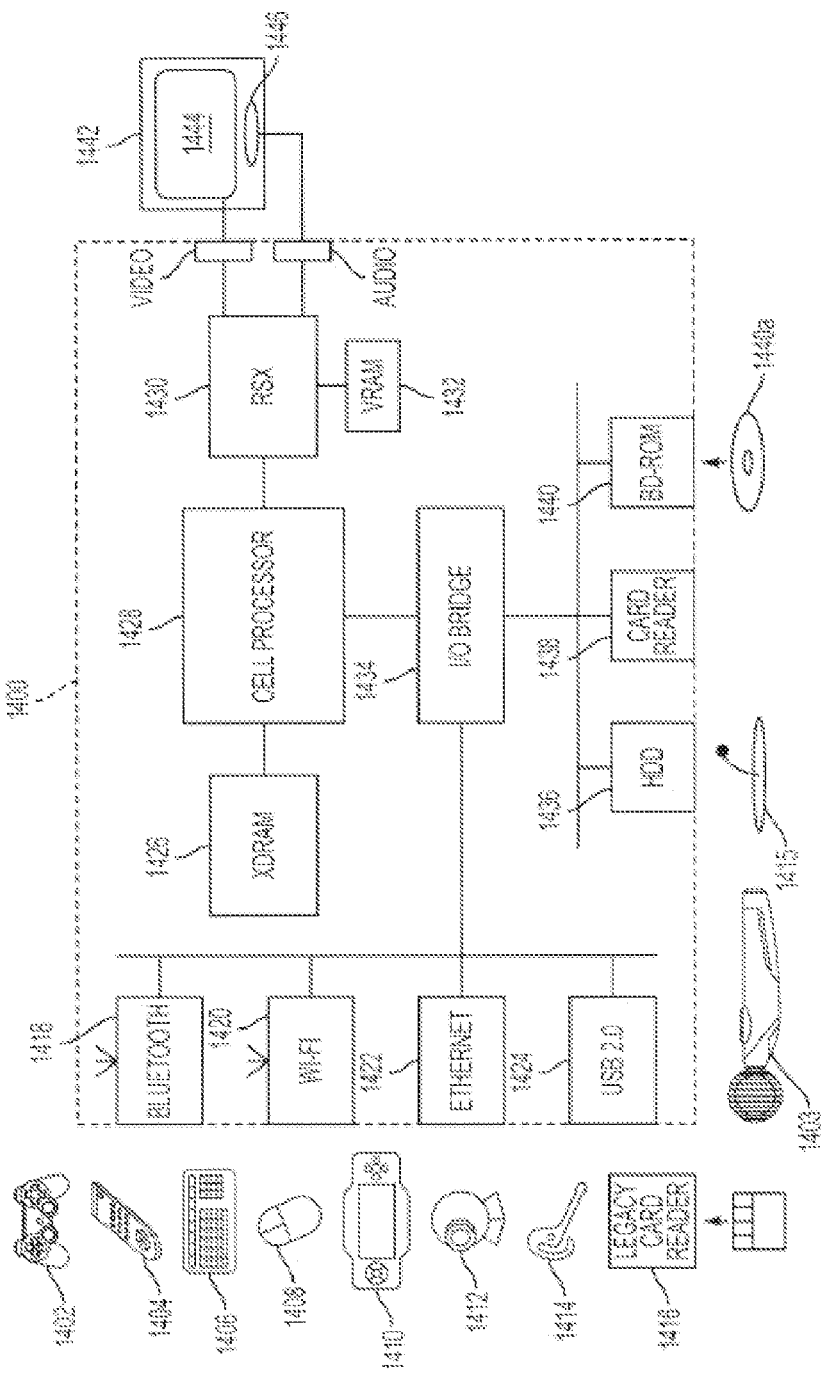
FIG. 19 illustrates hardware and user interfaces that may be used to determine controller location, in accordance with one embodiment of the present invention.

FIG. 19 illustrates hardware and user interfaces that may be used for delivering supplemental content within streamed media, in accordance with one embodiment of the present invention. FIG. 19 schematically illustrates the overall system architecture of the Sony® Playstation 3® entertainment device, a console that may be compatible for interfacing a control device with a computer program executing at a base computing device in accordance with embodiments of the present invention. A system unit 1400 is provided, with various peripheral devices connectable to the system unit 1400. The system unit 1400 comprises: a Cell processor 1428; a Rambus® dynamic random access memory (XDRAM) unit 1426; a Reality Synthesizer graphics unit 1430 with a dedicated video random access memory (VRAM) unit 1432; and an I/O bridge 1434. The system unit 1400 also comprises a Blu Ray® Disk BD-ROM® optical disk reader 1440 for reading from a disk 1440a and a removable slot-in hard disk drive (HDD) 1436, accessible through the I/O bridge 1434. Optionally the system unit 1400 also comprises a memory card reader 1438 for reading compact flash memory cards, Memory Stick® memory cards and the like, which is similarly accessible through the I/O bridge 1434.

The I/O bridge 1434 also connects to six Universal Serial Bus (USB) 2.0 ports 1424; a gigabit Ethernet port 1422; an IEEE 802.11b/g wireless network (Wi-Fi) port 1420; and a Bluetooth® wireless link port 1418 capable of supporting of up to seven Bluetooth connections.

In operation, the I/O bridge 1434 handles all wireless, USB and Ethernet data, including data from one or more game controllers 1402-1403. For example when a user is playing a game, the I/O bridge 1434 receives data from the game controller 1402-1403 via a Bluetooth link and directs it to the Cell processor 1428, which updates the current state of the game accordingly.

The wireless, USB and Ethernet ports also provide connectivity for other peripheral devices in addition to game controllers 1402-1403, such as: a remote control 1404; a keyboard 1406; a mouse 1408; a portable entertainment device 1410 such as a Sony Playstation Portable® entertainment device; a video camera such as an EyeToy® video camera 1412; a microphone headset 1414; and a microphone 1415. Such peripheral devices may therefore in principle be connected to the system unit 1400 wirelessly; for example the portable entertainment device 1410 may communicate via a Wi-Fi ad-hoc connection, whilst the microphone headset 1414 may communicate via a Bluetooth link.

The provision of these interfaces means that the Playstation 3 device is also potentially compatible with other peripheral devices such as digital video recorders (DVRs), set-top boxes, digital cameras, portable media players, Voice over IP telephones, mobile telephones, printers and scanners.

In addition, a legacy memory card reader 1416 may be connected to the system unit via a USB port 1424, enabling the reading of memory cards 1448 of the kind used by the Playstation® or Playstation 2® devices.

The game controllers 1402-1403 are operable to communicate wirelessly with the system unit 1400 via the Bluetooth link, or to be connected to a USB port, thereby also providing power by which to charge the battery of the game controllers 1402-1403. Game controllers 1402-1403 can also include memory, a processor, a memory card reader, permanent memory such as flash memory, light emitters such as an illuminated spherical section, LEDs, or infrared lights, microphone and speaker for ultrasound communications, an acoustic chamber, a digital camera, an internal clock, a recognizable shape such as the spherical section facing the game console, and wireless communications using protocols such as Bluetooth®, WiFi™, etc.

Game controller 1402 is a controller designed to be used with two hands, and game controller 1403 is a single-hand controller with a ball attachment. In addition to one or more analog joysticks and conventional control buttons, the game controller is susceptible to three-dimensional location determination. Consequently gestures and movements by the user of the game controller may be translated as inputs to a game in addition to or instead of conventional button or joystick commands. Optionally, other wirelessly enabled peripheral devices such as the Playstation™ Portable device may be used as a controller. In the case of the Playstation™ Portable device, additional game or control information (for example, control instructions or number of lives) may be provided on the screen of the device. Other alternative or supplementary control devices may also be used, such as a dance mat (not shown), a light gun (not shown), a steering wheel and pedals (not shown) or bespoke controllers, such as a single or several large buttons for a rapid-response quiz game (also not shown).

The remote control 1404 is also operable to communicate wirelessly with the system unit 1400 via a Bluetooth link. The remote control 1404 comprises controls suitable for the operation of the Blu Ray™ Disk BD-ROM reader 1440 and for the navigation of disk content.

The Blu Ray™ Disk BD-ROM reader 1440 is operable to read CD-ROMs compatible with the Playstation and PlayStation 2 devices, in addition to conventional pre-recorded and recordable CDs, and so-called Super Audio CDs. The reader 1440 is also operable to read DVD-ROMs compatible with the Playstation 2 and PlayStation 3 devices, in addition to conventional pre-recorded and recordable DVDs. The reader 1440 is further operable to read BD-ROMs compatible with the Playstation 3 device, as well as conventional pre-recorded and recordable Blu-Ray Disks.

The system unit 1400 is operable to supply audio and video, either generated or decoded by the Playstation 3 device via the Reality Synthesizer graphics unit 1430, through audio and video connectors to a display and sound output device 1442 such as a monitor or television set having a display 1444 and one or more loudspeakers 1446. The audio connectors 1450 may include conventional analogue and digital outputs whilst the video connectors 1452 may variously include component video, S-video, composite video and one or more High Definition Multimedia Interface (HDMI) outputs. Consequently, video output may be in formats such as PAL or NTSC, or in 720p, 1080i or 1080p high definition.

Audio processing (generation, decoding and so on) is performed by the Cell processor 1428. The Playstation 3 device's operating system supports Dolby® 5.1 surround sound, Dolby® Theatre Surround (DTS), and the decoding of 7.1 surround sound from Blu-Ray® disks.

In the present embodiment, the video camera 1412 comprises a single charge coupled device (CCD), an LED indicator, and hardware-based real-time data compression and encoding apparatus so that compressed video data may be transmitted in an appropriate format such as an intra-image based MPEG (motion picture expert group) standard for decoding by the system unit 1400. The camera LED indicator is arranged to illuminate in response to appropriate control data from the system unit 1400, for example to signify adverse lighting conditions. Embodiments of the video camera 1412 may variously connect to the system unit 1400 via a USB, Bluetooth or Wi-Fi communication port. Embodiments of the video camera may include one or more associated microphones and also be capable of transmitting audio data. In embodiments of the video camera, the CCD may have a resolution suitable for high-definition video capture. In use, images captured by the video camera may for example be incorporated within a game or interpreted as game control inputs. In another embodiment the camera is an infrared camera suitable for detecting infrared light.

In general, in order for successful data communication to occur with a peripheral device such as a video camera or remote control via one of the communication ports of the system unit 1400, an appropriate piece of software such as a device driver should be provided. Device driver technology is well-known and will not be described in detail here, except to say that the skilled man will be aware that a device driver or similar software interface may be required in the present embodiment described.

Figure 20:
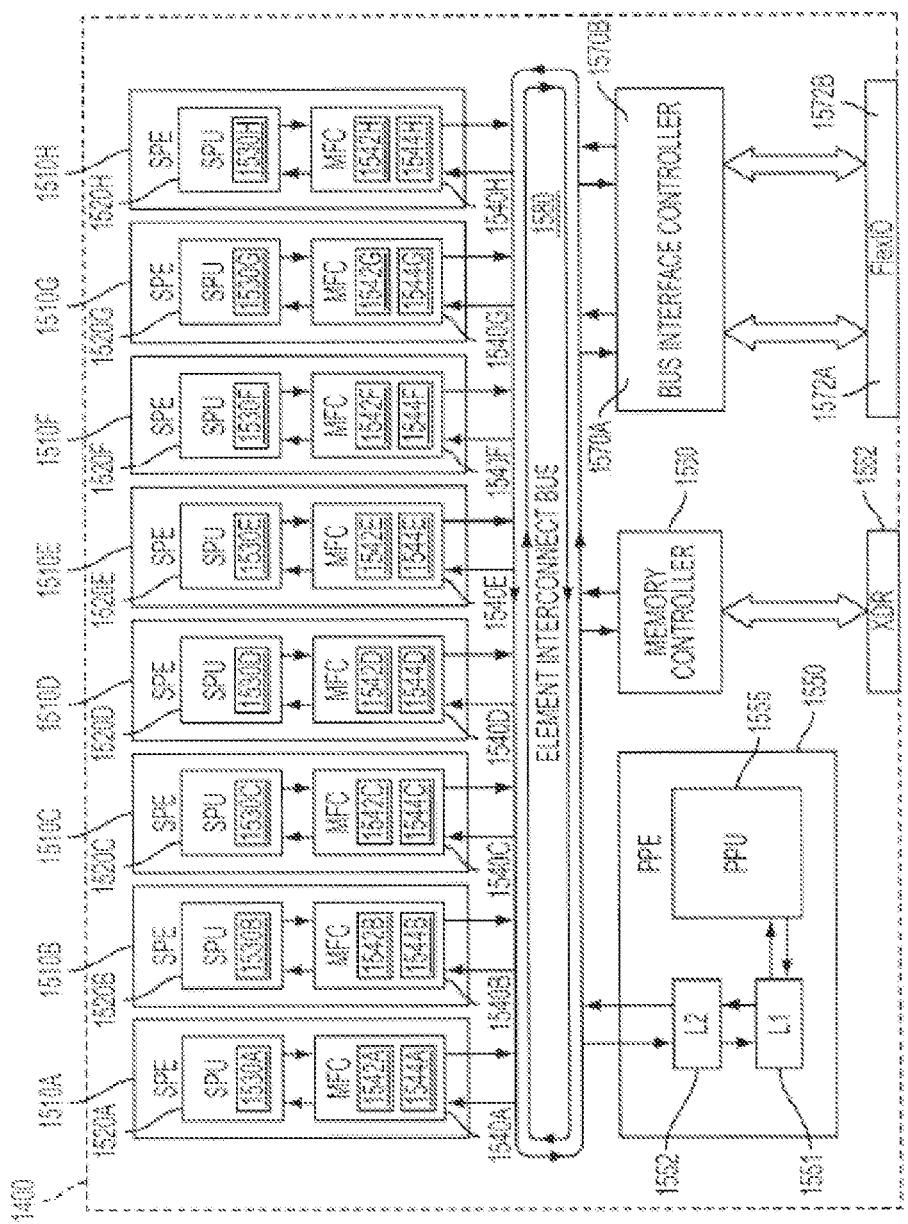
FIG. 20 illustrates additional hardware that may be used to process instructions, in accordance with one embodiment of the present invention.

FIG. 20 illustrates additional hardware that may be used to process instructions, in accordance with one embodiment of the present invention. Cell processor 1428 has an architecture comprising four basic components: external input and output structures comprising a memory controller 1560 and a dual bus interface controller 1570A, B; a main processor referred to as the Power Processing Element 1550; eight co-processors referred to as Synergistic Processing Elements (SPEs) 1510A-H; and a circular data bus connecting the above components referred to as the Element Interconnect Bus 1580. The total floating point performance of the Cell processor is 218 GFLOPS, compared with the 6.2 GFLOPs of the Playstation 2 device's Emotion Engine.

The Power Processing Element (PPE) 1550 is based upon a two-way simultaneous multithreading Power 1470 compliant PowerPC core (PPU) 1555 running with an internal clock of 3.2 GHz. It comprises a 512 kB level 2 (L2) cache and a 32 kB level 1 (L1) cache. The PPE 1550 is capable of eight single position operations per clock cycle, translating to 25.6 GFLOPs at 3.2 GHz. The primary role of the PPE 1550 is to act as a controller for the Synergistic Processing Elements 1510A-H, which handle most of the computational workload. In operation the PPE 1550 maintains a job queue, scheduling jobs for the Synergistic Processing Elements 1510A-H and monitoring their progress. Consequently each Synergistic Processing Element 1510A-H runs a kernel whose role is to fetch a job, execute it and synchronized with the PPE 1550.

Each Synergistic Processing Element (SPE) 1510A-H comprises a respective Synergistic Processing Unit (SPU) 1520A-H, and a respective Memory Flow Controller (MFC) 1540A-H comprising in turn a respective Dynamic Memory Access Controller (DMAC) 1542A-H, a respective Memory Management Unit (MMU) 1544A-H and a bus interface (not shown). Each SPU 1520A-H is a RISC processor clocked at 3.2 GHz and comprising 256 kB local RAM 1530A-H, expandable in principle to 4 GB. Each SPE gives a theoretical 25.6 GFLOPS of single precision performance. An SPU can operate on 4 single precision floating point members, 4 32-bit numbers, 8 16-bit integers, or 16 8-bit integers in a single clock cycle. In the same clock cycle it can also perform a memory operation. The SPU 1520A-H does not directly access the system memory XDRAM 1426; the 64-bit addresses formed by the SPU 1520A-H are passed to the MFC 1540A-H which instructs its DMA controller 1542A-H to access memory via the Element Interconnect Bus 1580 and the memory controller 1560.

The Element Interconnect Bus (EIB) 1580 is a logically circular communication bus internal to the Cell processor 1428 which connects the above processor elements, namely the PPE 1550, the memory controller 1560, the dual bus interface 1570A,B and the 8 SPEs 1510A-H, totaling 12 participants. Participants can simultaneously read and write to the bus at a rate of 8 bytes per clock cycle. As noted previously, each SPE 1510A-H comprises a DMAC 1542A-H for scheduling longer read or write sequences. The EIB comprises four channels, two each in clockwise and anti-clockwise directions. Consequently for twelve participants, the longest step-wise data-flow between any two participants is six steps in the appropriate direction. The theoretical peak instantaneous EIB bandwidth for 12 slots is therefore 96B per clock, in the event of full utilization through arbitration between participants. This equates to a theoretical peak bandwidth of 307.2 GB/s (gigabytes per second) at a clock rate of 3.2 GHz.

The memory controller 1560 comprises an XDRAM interface 1562, developed by Rambus Incorporated. The memory controller interfaces with the Rambus XDRAM 1426 with a theoretical peak bandwidth of 25.6 GB/s.

The dual bus interface 1570A,B comprises a Rambus FlexIO® system interface 1572A,B. The interface is organized into 12 channels each being 8 bits wide, with five paths being inbound and seven outbound. This provides a theoretical peak bandwidth of 62.4 GB/s (36.4 GB/s outbound, 26 GB/s inbound) between the Cell processor and the I/O Bridge 700 via controller 170A and the Reality Simulator graphics unit 200 via controller 170B.

Data sent by the Cell processor 1428 to the Reality Simulator graphics unit 1430 will typically comprise display lists, being a sequence of commands to draw vertices, apply textures to polygons, specify lighting conditions, and so on.

Figure 21:
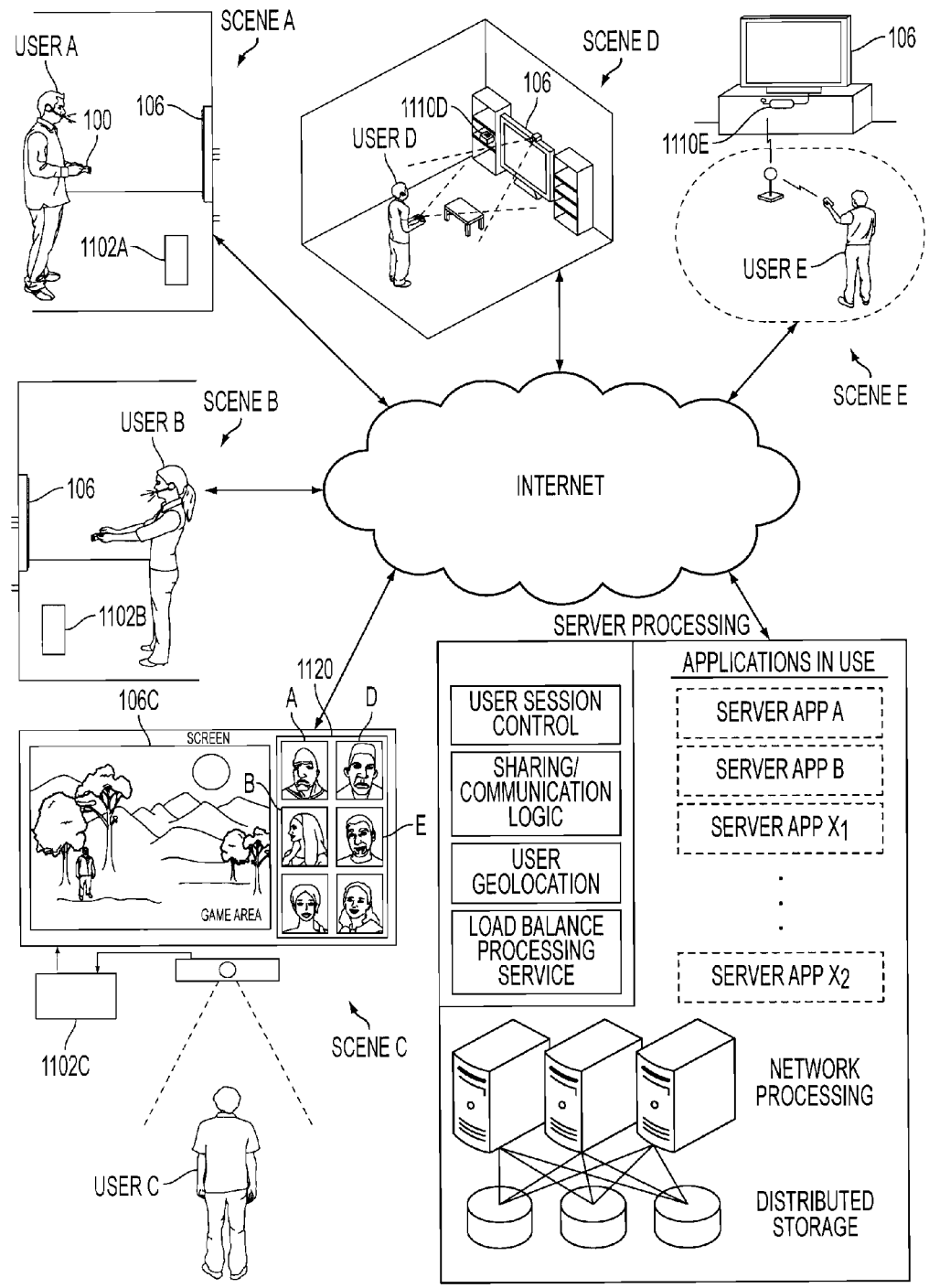
FIG. 21 is an exemplary illustration of scene A through scene E with respective user A through user E interacting with game clients 1102 that are connected to server processing via the internet, in accordance with one embodiment of the present invention.

FIG. 21 is an exemplary illustration of scene A through scene E with respective user A through user E interacting with game clients 1102 that are connected to server processing via the internet, in accordance with one embodiment of the present invention. A game client is a device that allows users to connect to server applications and processing via the internet. The game client allows users to access and playback online entertainment content such as but not limited to games, movies, music and photos. Additionally, the game client can provide access to online communications applications such as VOIP, text chat protocols, and email.

A user interacts with the game client via controller. In some embodiments the controller is a game client specific controller while in other embodiments, the controller can be a keyboard and mouse combination. In one embodiment, the game client is a standalone device capable of outputting audio and video signals to create a multimedia environment through a monitor/television and associated audio equipment. For example, the game client can be, but is not limited to a thin client, an internal PCI-express card, an external PCI-express device, an ExpressCard device, an internal, external, or wireless USB device, or a Firewire device, etc. In other embodiments, the game client is integrated with a television or other multimedia device such as a DVR, Blu-Ray player, DVD player or multi-channel receiver.

Within scene A of FIG. 21, user A interacts with a client application displayed on a monitor 106 using a controller 100 paired with game client 1102A. Similarly, within scene B, user B interacts with another client application that is displayed on monitor 106 using a controller 100 paired with game client 1102B. Scene C illustrates a view from behind user C as he looks at a monitor displaying a game and buddy list from the game client 1102C. While FIG. 21 shows a single server processing module, in one embodiment, there are multiple server processing modules throughout the world. Each server processing module includes sub-modules for user session control, sharing/communication logic, user geo-location, and load balance processing service. Furthermore, a server processing module includes network processing and distributed storage.

When a game client 1102 connects to a server processing module, user session control may be used to authenticate the user. An authenticated user can have associated virtualized distributed storage and virtualized network processing. Examples items that can be stored as part of a user's virtualized distributed storage include purchased media such as, but not limited to games, videos and music etc. Additionally, distributed storage can be used to save game status for multiple games, customized settings for individual games, and general settings for the game client. In one embodiment, the user geo-location module of the server processing is used to determine the geographic location of a user and their respective game client. The user's geographic location can be used by both the sharing/communication logic and the load balance processing service to optimize performance based on geographic location and processing demands of multiple server processing modules. Virtualizing either or both network processing and network storage would allow processing tasks from game clients to be dynamically shifted to underutilized server processing module(s). Thus, load balancing can be used to minimize latency associated with both recall from storage and with data transmission between server processing modules and game clients.

As shown in FIG. 21, the server processing module has instances of server application A and server application B. The server processing module is able to support multiple server applications as indicated by server application $X_1$ and server application $X_2$. In one embodiment, server processing is based on cluster computing architecture that allows multiple processors within a cluster to process server applications. In another embodiment, a different type of multi-computer processing scheme is applied to process the server applications. This allows the server processing to be scaled in order to accommodate a larger number of game clients executing multiple client applications and corresponding server applications. Alternatively, server processing can be scaled to accommodate increased computing demands necessitated by more demanding graphics processing or game, video compression, or application complexity. In one embodiment, the server processing module performs the majority of the processing via the server application. This allows relatively expensive components such as graphics processors, RAM, and general processors to be centrally located and reduces to the cost of the game client. Processed server application data is sent back to the corresponding game client via the internet to be displayed on a monitor.

Scene C illustrates an exemplary application that can be executed by the game client and server processing module. For example, in one embodiment game client 1102C allows user C to create and view a buddy list 1120 that includes user A, user B, user D and user E. As shown, in scene C, user C is able to see either real time images or avatars of the respective user on monitor 106C. Server processing executes the respective applications of game client 1102C and with the respective game clients 1102 of users A, user B, user D and user E. Because the server processing is aware of the applications being executed by game client B, the buddy list for user A can indicate which game user B is playing. Further still, in one embodiment, user A can view actual in game video directly from user B. This is enabled by merely sending processed server application data for user B to game client A in addition to game client B.

In addition to being able to view video from buddies, the communication application can allow real-time communications between buddies. As applied to the previous example, this allows user A to provide encouragement or hints while watching real-time video of user B. In one embodiment two-way real time voice communication is established through a client/server application. In another embodiment, a client/server application enables text chat. In still another embodiment, a client/server application converts speech to text for display on a buddy's screen.

Scene D and scene E illustrate respective user D and user E interacting with game consoles 1110D and 1110E respectively. Each game console 1110D and 1110E are connected to the server processing module and illustrate a network where the server processing modules coordinates game play for both game consoles and game clients.

Embodiments of the present invention may be practiced with various computer system configurations including handheld devices, microprocessor systems, microprocessor-based or programmable consumer electronics, minicomputers, mainframe computers and the like. The invention can also be practiced in distributed computing environments where tasks are performed by remote processing devices that are linked through a network.

With the above embodiments in mind, it should be understood that the invention can employ various computer-implemented operations involving data stored in computer systems. These operations are those requiring physical manipulation of physical quantities. Any of the operations described herein that form part of the invention are useful machine operations. The invention also relates to a device or an apparatus for performing these operations. The apparatus may be specially constructed for the required purpose, such as a special purpose computer. When defined as a special purpose computer, the computer can also perform other processing, program execution or routines that are not part of the special purpose, while still being capable of operating for the special purpose. Alternatively, the operations may be processed by a general purpose computer selectively activated or configured by one or more computer programs stored in the computer memory, cache, or obtained over a network. When data is obtained over a network the data maybe processed by other computers on the network, e.g., a cloud of computing resources.

The embodiments of the present invention can also be defined as a machine that transforms data from one state to another state. The transformed data can be saved to storage and then manipulated by a processor. The processor thus transforms the data from one thing to another. Still further, the methods can be processed by one or more machines or processors that can be connected over a network. Each machine can transform data from one state or thing to another, and can also process data, save data to storage, transmit data over a network, display the result, or communicate the result to another machine.

The invention can also be embodied as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for delivering supplemental content within streamed media, the method comprising:
   receiving, at a client, scheduling criteria for addition of supplemental content (SC) at the client, the scheduling criteria including a plurality of SC items, wherein each SC item includes a criteria for insertion including a target demographic and a trigger condition that includes at least a media content type;
   obtaining a stream of a media segment at a client from a media server;
   receiving SC for insertion in the media segment;
   analyzing the media segment against the scheduling criteria of the received SC to determine an insertion place of the SC in the media segment, wherein analyzing includes determining if the SC is for the target demographic and if the media segment satisfies the trigger condition associated with the SC;
   combining the media segment with the SC at the client based on the analysis to add or augment a plurality of video frames of the media segment; and
   displaying the media segment and the SC at a point in time after the target demographic and the trigger condition are satisfied, wherein a duration of SC display has a first value when the user abstains from interacting with the SC while the SC is displayed at the client, and wherein the duration of SC display is shortened when the user interacts with the SC while the SC is displayed.

2. The method as recited in claim 1, wherein the scheduling criteria further includes one or more of client computing device, client interfaces, user age, user income, user geographic location, time of SC delivery, number of impressions desired for the SC, SC age rating, or client bandwidth.

3. The method as recited in claim 1, wherein the SC is selected from a group consisting of a fixed-length video, an interactive video, an interactive game, an overlay placed on a subset of video frames, a computer program, a photographic display, or an interactive presentation.

4. The method as recited in claim 3, wherein the interactive game is selected from a group consisting of a game where a user says a password to finish displaying the SC, a single player game, a multiplayer game, an off-line game, an online game, an interactive game, a voice-command game, a motion detection game, or an image analysis game.

5. The method as recited in claim 1, wherein the SC display duration has a first value when a user abstains from interacting with the SC while the SC is presented at the client, and wherein the SC display duration is shortened when the user interacts with the SC while the SC is presented.

6. The method as recited in claim 1 further comprising:
   sending a SC displayed confirmation to the SC server after the SC is displayed.

7. The method as recited in claim 1 further comprising:
   storing downloaded media content at the client for future user viewing;
   receiving information on media available on a plurality of servers for download; and
   browsing at the client for media available locally or on the plurality of servers.

8. A system for delivering supplemental content within streamed media, the system comprising:
   a supplemental content (SC) server;
   wherein the SC server selects SC and transfers SC and SC instructions to a client after the client notifies the SC server of a request received from a user for a media segment downloadable from one or more independent media servers;
   wherein the client combines the media segment with the SC by inserting the SC to add or augment video frames within the media segment based on the SC instructions, wherein the SC instructions include a predetermined time period for displaying the SC, wherein the client determines a place for inserting the SC in the media segment based on characteristics of the SC and based on the predetermined time period, wherein the SC is combined with the media segment by placing the SC immediately after a commercial embedded in the media segment, and wherein the client displays the media segment with the SC.

9. The system as recited in claim 8, wherein the SC server transfers a same SC to a plurality of clients, wherein the SC instructions for the same SC include inserting into the media segments the same SC at different points at each client from the plurality of clients depending on available insertion windows in each media segment and depending on the same SC being displayed within the predetermined time period, the available insertion windows defining where SC can be inserted within each media segment.

10. The system as recited in claim 8, wherein the media server provides media segment metadata, the metadata being selected from a group consisting of a place for insertion of SC in the media segment, information on existing embedded commercials in the media segment, a command to add SC, a command to replace a section of the media segment with SC, or a command to delete some video frames in the media segment.

11. The system as recited in claim 8, wherein the SC is combined with the media segment by placing the SC immediately before the media segment.

12. The system as recited in claim 8, wherein displaying the media segment includes showing a status bar on a display indicating location of commercials in the media segment and inserted SC.

13. The system as recited in claim 8 further including:
a peripheral for interfacing the client with a user, the peripheral being selected from a group consisting of a game controller, a remote control, a microphone, a camera facing the user, a keyboard, or a mouse.

14. The system as recited in claim 8, wherein the client is selected from a group consisting of a game console, a personal computer, a laptop computer, a phone, a PDA, a set-top box, or a TV with a programmable module.

15. The system as recited in claim 8, wherein the SC server further includes:
a user database with information about a plurality of users;
an SC database holding a plurality of downloadable SC modules;
a media metadata database with information about media segments available for download; and
a partner database with information about media content owners, content distributors and advertisers.

16. The system as recited in claim 8, wherein the client further includes:
a content buffer for buffering media segments being downloaded;
a media library for storing media content and information about media content available for download; and
a SC manager for managing the displaying of SC.

17. The method as recited in claim 1, wherein displaying the combination includes displaying the SC while buffering the media segment.

18. The method as recited in claim 1 further including:
displaying SC without the media segment after receiving a second request at the client, the second request including a command to display the SC without the media segment.

19. The method as recited in claim 1, wherein displaying the combination of media segment further includes:
displaying simultaneously the media segment with the SC.

20. The method as recited in claim 1 further including:
receiving input from a plurality of users indicating when a commercial in the media segment starts.

21. The method as recited in claim 1 further including:
receiving information from a plurality of users indicating when a user fast forwards reproduction of the media segment while the media segment is being displayed.

22. The method as recited in claim 1, wherein operations of the method are performed by a computer program when executed by one or more processors, the computer program being embedded in a non-transitory computer-readable storage medium.

23. A method for delivering supplemental content within streamed media, the method comprising:
receiving a request at a client for a media segment, the media segment including a plurality of video frames;
obtaining a stream of the media segment at the client sent from a media server;
receiving from the media server supplemental content (SC) and SC instructions for insertion of the SC in the media segment after obtaining at least part of the stream;
combining the media segment with the SC at the client according to the SC instructions, the combining including inserting the SC to add or augment video frames of the media segment; and
displaying the combination of media segment and SC, wherein displaying the combination further includes:
providing an option to a user to interact with the SC while displaying the SC;
determining if the user interact with the SC; and
terminating the display of the SC when the user interacts with the SC, wherein the display duration has a first value when the user abstains from interacting with the SC while the SC is displayed at the client, and wherein the SC display duration is shortened when the user interacts with the SC while the SC is displayed.

24. The method as recited in claim 1, wherein combining the media segment with the SC further includes:
inserting the SC where the media content includes one or more of a fade to black, a period of silence, or a variation in sound properties.

25. A method comprising:
receiving, at a client, media content in response to a request from a user having a user account for accessing the media content, the media content including one or more first commercial messages embedded in the media content;
receiving, at the client, second commercial content and scheduling criteria for the second commercial content, the scheduling criteria including at least a target demographic and a trigger condition for a media content type;
identifying a user demographic of the user based on the user account and a content type associated with the media content;
identifying, at the client, a location in the media content for inserting the second commercial content based on the user demographic, the target demographic, the content type associated with the media content, and the trigger condition in the scheduling criteria for the media content type; and
displaying, at the client, the media content and the second commercial content based on the identifying, wherein a duration of display of the second commercial content has a first value when the user abstains from interacting with the second commercial content while the second commercial content is displayed at the client, and wherein the duration of display of the second commercial content is shortened when the user interacts with the second commercial content while the second commercial content is displayed, wherein operations of the method are executed by a processor.

26. The method as recited in claim 25, wherein the commercial content is a game, wherein displaying the commercial content includes enabling user interaction to achieve a predefined result in the game, wherein achieving the predefined result enables a change in display time of the commercial content before resuming displaying the media content.

* * * * *